(12) United States Patent
Miyazawa et al.

(10) Patent No.: US 12,284,320 B2
(45) Date of Patent: Apr. 22, 2025

(54) DISPLAY APPARATUS, DISPLAY CONTROL METHOD FOR DISPLAY APPARATUS, AND STORAGE MEDIUM

(71) Applicant: SEIKO EPSON CORPORATION, Tokyo (JP)

(72) Inventors: Masaki Miyazawa, Matsumoto (JP); Hiroyuki Kosuge, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/804,292

(22) Filed: May 26, 2022

(65) Prior Publication Data

US 2022/0385774 A1    Dec. 1, 2022

(30) Foreign Application Priority Data

May 28, 2021   (JP) .................................. 2021-089897

(51) Int. Cl.
*H04N 1/00*           (2006.01)

(52) U.S. Cl.
CPC ..... *H04N 1/00411* (2013.01); *H04N 1/00037* (2013.01); *H04N 1/00076* (2013.01); *H04N 1/00909* (2013.01); *H04N 1/00832* (2013.01)

(58) Field of Classification Search
None
See application file for complete search history.

(56) References Cited

U.S. PATENT DOCUMENTS

| | | | |
|---|---|---|---|
| 4,992,779 A * | 2/1991 | Sugino | G06F 3/0488 341/23 |
| 5,500,655 A | 3/1996 | Isawa et al. | |
| 6,208,331 B1 * | 3/2001 | Singh | G06F 3/0488 345/173 |
| 8,264,470 B2 | 9/2012 | Sakurai | |
| 2010/0033444 A1 * | 2/2010 | Kobayashi | G06F 3/0488 345/173 |
| 2010/0045623 A1 * | 2/2010 | Sakurai | G06F 3/0416 345/173 |
| 2010/0225662 A1 * | 9/2010 | Nakayama | G06F 3/0488 345/589 |

(Continued)

FOREIGN PATENT DOCUMENTS

| | | | | |
|---|---|---|---|---|
| CN | 103809887 | * | 5/2014 | ............. G06F 3/041 |
| EP | 3136219 | * | 3/2017 | ........... G06F 3/0488 |

(Continued)

*Primary Examiner* — Beniyam Menberu
(74) *Attorney, Agent, or Firm* — WORKMAN NYDEGGER

(57) ABSTRACT

A multi-function printer, which is an example of a display apparatus, includes a display section with a screen and a controller that changes display content of the screen. The multi-function printer includes the display section including an input section for input of a location on the screen as a contact location by a touch on the screen, and the controller that controls the display section. At least one of the factors indicating the degree of contamination of the screen since the previous screen cleanup is used as a parameter. In this case, the controller accumulates the value of at least one parameter since the previous screen cleanup and, in accordance with the accumulated value of the parameter, reducing the degree of visibility of display content displayed on the screen.

16 Claims, 12 Drawing Sheets

(56) References Cited

U.S. PATENT DOCUMENTS

| | | | |
|---|---|---|---|
| 2010/0245384 A1* | 9/2010 | Mase | G06F 3/0418 |
| | | | 345/173 |
| 2017/0115235 A1* | 4/2017 | Ohlsson | G01N 21/94 |
| 2017/0270258 A1* | 9/2017 | Duckert | G16H 40/40 |
| 2018/0136833 A1* | 5/2018 | Perkins | G06F 3/167 |
| 2021/0059784 A1* | 3/2021 | Nesterenko | G05B 19/406 |
| 2021/0383112 A1* | 12/2021 | Zhan | G06V 40/1318 |
| 2023/0088921 A1* | 3/2023 | Borg | G06Q 10/0631 |
| | | | 345/173 |

FOREIGN PATENT DOCUMENTS

| | | | | |
|---|---|---|---|---|
| JP | 05-94248 | | 4/1993 | |
| JP | H11-085401 A | | 3/1999 | |
| JP | 2009071438 | * | 4/2009 | G06F 3/041 |
| JP | 2010033222 | * | 2/2010 | H04N 1/00 |
| JP | 2010-061654 | | 3/2010 | |
| JP | 2010129026 | * | 6/2010 | G06F 3/041 |
| JP | 2010165174 | * | 7/2010 | G06F 3/041 |
| JP | 2010-205012 | | 9/2010 | |
| JP | 2010-237599 | | 10/2010 | |
| JP | 2010230399 | * | 10/2010 | G01N 35/00 |
| JP | 2011158970 | * | 8/2011 | G06F 3/023 |
| JP | 2012026857 | * | 2/2012 | G01N 21/958 |
| JP | 2013019932 | * | 1/2013 | G06F 3/041 |
| JP | 2021018670 | * | 2/2021 | G06F 21/31 |

* cited by examiner

DISPLAY APPARATUS, DISPLAY CONTROL METHOD FOR DISPLAY APPARATUS, AND STORAGE MEDIUM

The present application is based on, and claims priority from JP Application Serial Number 2021-089897, filed May 28, 2021, the disclosure of which is hereby incorporated by reference herein in its entirety.

BACKGROUND

1. Technical Field

The present disclosure relates to a display apparatus with a screen that allows for input through a contact, a display control method for the display apparatus, and a storage medium.

2. Related Art

For example, JP-A-2010-205012 discloses a display device including an operation panel of a touch panel type. In this printer, when the user cleans a screen, the degree of completion of cleaning is determined using an accumulated number of touched pixels and, if the accumulated number exceeds a certain value, it is determined that the cleaning is complete.

In addition, JP-A-5-94248 discloses a display device having a capability of reducing malfunction due to an accidental operation of another operation key than an intended key by mistake when cleaning is carried out. This printer includes a hard key capable of disabling an operation of the other operation key during cleaning.

However, in JP-A-2010-205012 mentioned above, although the degree of completion of cleaning is automatically determined, the necessity for cleaning is not taken into account. Use of this technique is limited to the case where the user wants to carry out cleaning.

In addition, in JP-A-5-94248, providing a hard key improves the ease of cleaning and improves the reliability of cleaning so as to ensure that only cleaning is carried out without causing a malfunction. However, as in JP-A-2010-205012, the timing to carry out cleaning is left to a voluntary action of the user.

As described above, in the related art techniques, although the ease of cleaning and the reliability in cleaning improve, a voluntary action of a user himself is just a prerequisite for the timing to carry out cleaning. Although, with a timer or the like, the timing to carry out cleaning may be reported as character information on a touch panel, the related art techniques are nothing more than techniques that expect a voluntary action of a user who has watched the timing. This raises an issue in that even if a screen is dirty, the screen may be left unattended without being cleaned by a user when there is no problem in the degree of visibility of the screen.

SUMMARY

A display apparatus includes a display section with a screen, including an input section for input of a location on the screen as a contact location by a touch on the screen, and a controller configured to change display content of the screen and configured to control the display section. When at least one of factors indicating a degree of contamination of the screen since previous screen cleanup is a parameter, the controller is configured to accumulate a value of the at least one parameter since the previous screen cleanup and is configured to, in accordance with the accumulated value of the parameter, reduce a degree of visibility of display content displayed on the screen.

Provided is a display control method for a display apparatus including a display section with a screen. The display apparatus includes the display section including an input section for input of a location on the screen as a contact location by a touch on the screen, and a controller configured to control an operation of the display section. The controller has, as an operation mode of the display section, a cleanup management mode for encouraging cleaning of the screen. The display control method includes, at least in the cleanup management mode, using, as a parameter, at least one of an elapsed time, a number of operations, an operation time period, or a number of persons who approached a multi-function printer, since previous cleanup, accumulating a value of the parameter and, in accordance with the accumulated value of the parameter, reducing a degree of visibility of display content of the display section, and increasing the degree of visibility of the display content of the display section in accordance with a contact area detected as a result of cleanup of the screen.

Provided is a non-transitory computer-readable storage medium storing a display control program executed by a computer included in a display apparatus including a display section with a screen. The display apparatus includes the display section including an input section for input of a location on the screen as a contact location by a touch on the screen, and the computer configured to control an operation of the display section. The computer has, as an operation mode of the display section, a cleanup management mode for encouraging cleaning of the screen. The display control program, when executed by the computer, causing the computer to execute, at least in the cleanup management mode, using, as a parameter, at least one of an elapsed time, the number of operations, an operation time period, or the number of persons who approached a multi-function printer, since previous cleanup, accumulating a value of the parameter and, in accordance with the accumulated value of the parameter, reducing a degree of visibility of display content of the display section, and increasing the degree of visibility of the display content of the display section in accordance with a contact area detected as a result of cleanup of the screen.

DESCRIPTION OF EXEMPLARY EMBODIMENTS

A multi-function printer 11, which is an embodiment of a display apparatus, will be described below with reference to the accompanying drawings.

Figure 1:
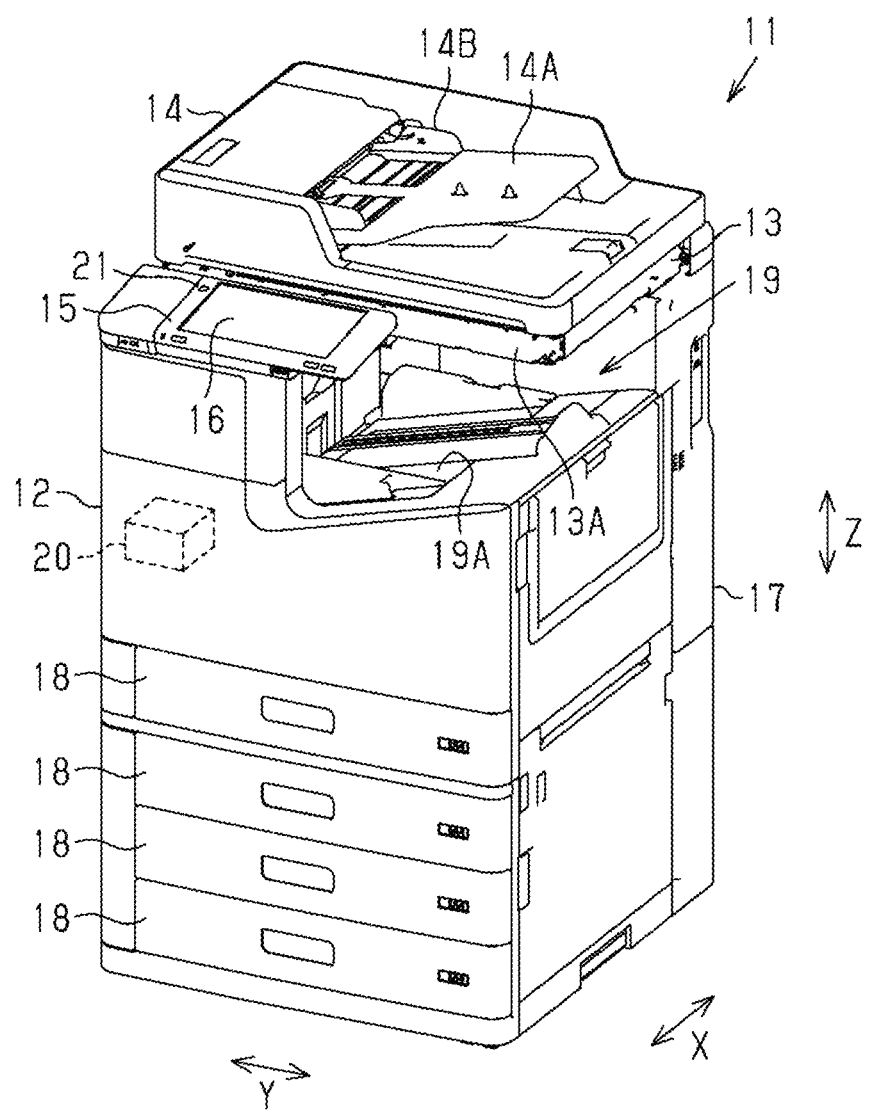
FIG. 1 is a perspective view illustrating a multi-function printer in a first embodiment.

In FIG. 1, the multi-function printer 11, which is assumed to be placed on a horizontal surface, has a width direction Y, a depth direction X, and a vertical direction Z. The width direction Y and the depth direction X are directions perpendicular to the vertical direction Z. In the multi-function printer 11, the side on which the display section 15 is provided is the front side.

Configuration of Multi-Function Printer

As illustrated in FIG. 1, the multi-function printer 11, which is an exemplary display apparatus, includes the display section 15 with a screen 16 and a controller 20 that controls the display content of the screen 16. The multi-function printer 11 includes a rectangular main body 12 and a reader 13 assembled to the top of the main body 12. The display section 15 is provided on the top of the main body 12. The display section 15 is located closer to the viewer than the reader 13 in the depth direction X. The screen 16 of the display section 15 is constituted by a touch panel, for example. Therefore, a user may issue an instruction to the multi-function printer 11 by operating the screen 16.

The display section 15 includes an operation section 21 in a portion other than the screen 16. The operation section 21 is constituted by a mechanical switch. With the operation section 21, a user may issue an instruction to the multi-function printer 11 by operating the operation section 21 even when the display content of the screen 16 disappears. The operation section 21 includes, for example, a power supply switch and so on.

The reader 13 illustrated in FIG. 1 reads an image of an original document (not illustrated). The reader 13 includes a platen 13A for mounting an original document and an automatic document feeder 14 for transporting the original document. The automatic document feeder 14 includes a document tray 14A on which an original document is able to be mounted and an edge guide 14B that aligns an original document mounted on the document tray 14A. The automatic document feeder 14 transports the original document mounted on the document tray 14A sheet by sheet along a transport path (not illustrated) passing through the reader 13. The reader 13 sequentially reads the original document transported by the automatic document feeder 14. The reader 13 has a feeding and reading function of reading an original document transported by the automatic document feeder 14 and a flatbed reading function of reading an original document mounted on the platen 13A.

The main body 12, in whole, constitutes a printing section 17. The printing section 17 includes a multi-layered cassette 18 for accommodating a medium (not illustrated), such as paper, and an exiting section 19 from which the medium transported from the cassette 18 and subjected to printing exits. The exiting section 19 is provided as a recess between the main body 12 and the reader 13. The exiting section 19 includes an exit tray 19A on which a medium that has exited is mounted.

The printing section 17 incorporates, in the main body 12, a transport section (refer to FIG. 2) that transports a medium along a transport path from the cassette 18 to the exit tray 19A and a recording head 23 (refer to FIG. 2) that carries out printing on the medium at a printing position in the middle of the transport path.

In addition, on the screen 16 of the display section 15 provided in the main body 12, a plurality of display screens including a main screen MG (refer to FIG. 3) and a sub screen, such as a selection screen, are selectively displayed. During the on state of the multi-function printer 11, when printing is not carried out, the main screen MG is usually displayed on the screen 16. The main screen MG is, for example, a menu screen.

Electrical Configuration of Multi-Function Printer

Figure 2:
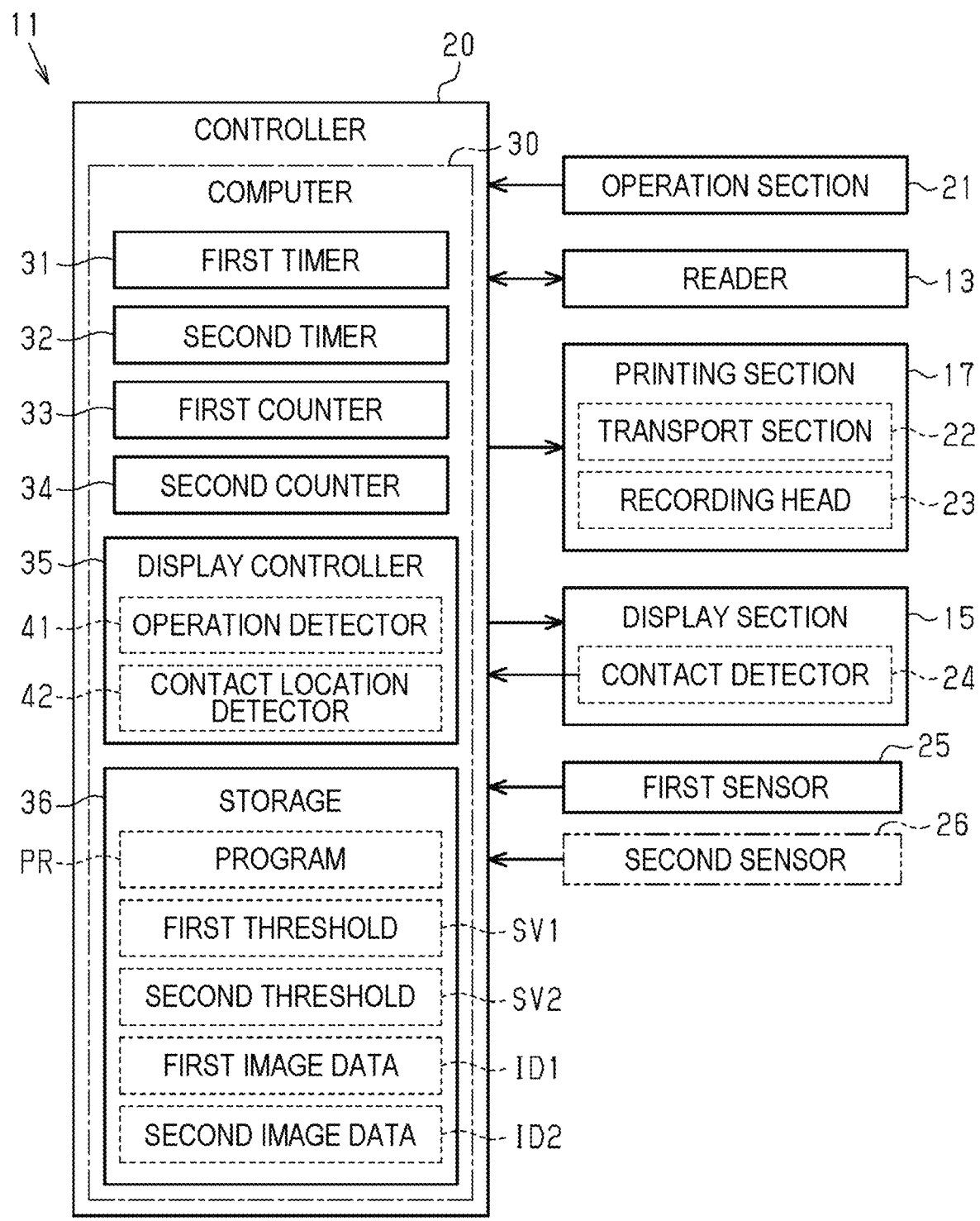
FIG. 2 is a block diagram illustrating an electrical configuration of the multi-function printer.

Next, with reference to FIG. 2, the electrical configuration of the multi-function printer 11 will be described.

The multi-function printer 11 includes the controller 20, the operation section 21, the reader 13, the printing section 17, the display section 15, and a first sensor 25.

The operation section 21 is an operation section constituted by, for example, a physical hard switch. Examples of the operation section include a power supply operation section that turns on or off the power supply of the multi-function printer 11.

The reader 13 is controlled by the controller 20 to read an original document. The printing section 17 includes a transport section 22 and the recording head 23. The printing section 17 is controlled by the controller 20, so that the recording head 23 records characters, images, or the like on a medium transported by the transport section 22. For example, when an instruction for copying is received, the controller 20 causes the reader 13 to read an original document and causes the printing section 17 to print an image of the read original document on the medium, thereby performing copying.

The display section 15 includes a contact detector 24. The display section 15 is constituted by a touch panel, for example. When a user touches the screen 16 (refer to FIGS. 1 and 3) with his finger, the contact detector 24 detects the coordinates of the contact location.

The first sensor 25 detects a person who has approached the multi-function printer 11 since the previous cleanup. The first sensor 25 is, for example, a person sensor. The multi-function printer 11 may also include a second sensor 26, which is an exemplary detector capable of detecting the values of environment parameters around the multi-function printer 11. The second sensor 26 detects at least one of the temperature, humidity, dust amount, or oil content amount of the ambient environment of the multi-function printer 11 or the body temperature of an operator who operates the screen 16 of the display section 15.

The controller 20 includes a computer 30. The computer 30 is constituted by a microprocessor, for example. When the contact detector 24 detects a contact at a location in the range of an input section 50 (refer to FIG. 3) displayed on the screen 16, the computer 30 detects that the input section 50 associated with the coordinate range is operated.

The computer 30 includes a first timer 31, a second timer 32, a first counter 33, a second counter 34, a display controller 35, and a storage 36.

The display controller 35 includes an operation detector 41 and a contact location detector 42. If the coordinate values input from the contact detector 24 that has detected the location at which a user has operated (touched) the screen 16 are values within the coordinate range of the input section 50 (FIG. 3), the operation detector 41 detects the touch on the screen 16 as an operation of the user based on the coordinate values.

The contact location detector 42 detects the location at which a user has come into contact with (has touched) the screen 16 based on the coordinate values input from the contact detector 24. For example, if a user touches the screen 16 of the display section 15 when wiping the screen 16 off for cleanup, the motion of the coordinates caused by the touch for wiping is detected. Therefore, with the contact location detector 42, the computer 30 may detect the location (wiping trajectory) at which the user has wiped the screen 16 off.

In the storage 36, a program PR, a first threshold SV1, a second threshold SV2, first image data ID1, and second image data ID2 are stored. The program PR includes a first program for a first display control process illustrated by a flowchart in FIG. 7 and a second program for a second display control process illustrated by a flowchart in FIG. 8. In addition, the first threshold SV1 is used in the first display control process and the second threshold SV2 is used in the second display control process. In addition, the first image data ID1 is image data of display content to be displayed on the screen 16. The first image data ID1 includes image data for displaying a display screen, such as the main screen MG illustrated in FIG. 3. The second image data ID2 is image data used for reducing the degree of visibility of display content to be displayed on the screen 16. The second image data ID2 is used in replacement of the first image data ID1 or used to display a superimposed image for reducing the degree of visibility on a display screen based on the first image data ID1.

A first program and a second program constituting the program PR that are stored in a storage medium may be installed in the multi-function printer 11. In this case, the storage medium storing the first program and the second program may be an accessory included with purchase of the multi-function printer 11 or may be purchased together with the multi-function printer 11. The storage medium may be, for example, a storage disk, such as a magnetic disk or optical disk, a portable memory, such as a universal serial bus (USB) memory, or an external storage device of an external type.

Display Content of Screen

Figure 3:
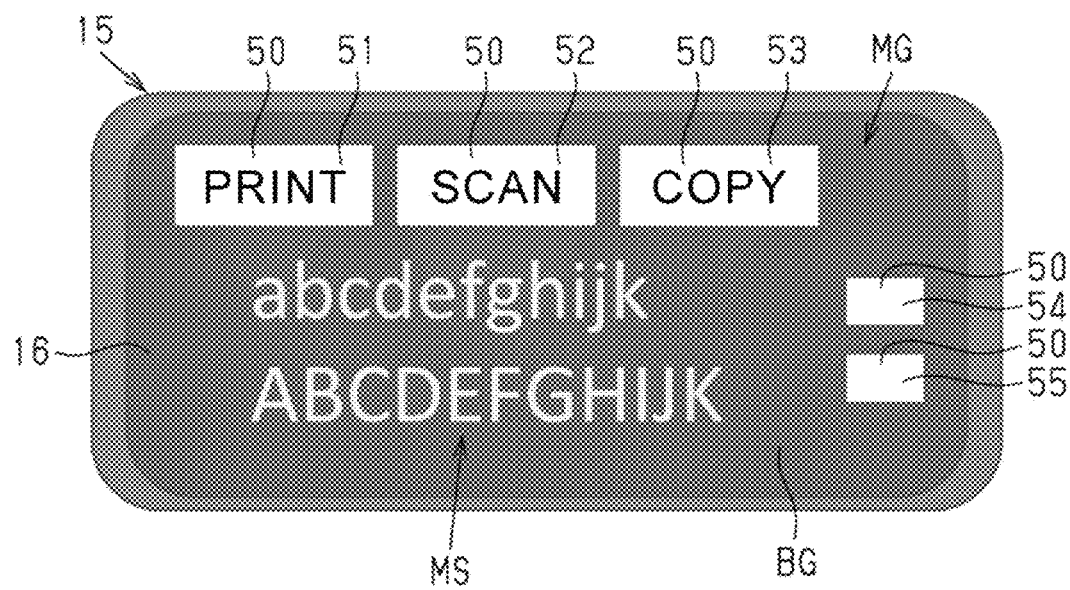
FIG. 3 is an illustrative diagram depicting a main screen displayed on a screen of a display section.

With reference to FIG. 3, the display content displayed on the screen 16 of the display section 15 by the display controller 35 will be described here. FIG. 3 is the main screen MG, which is an example of display content displayed on the screen 16 of the display section 15.

As illustrated in FIG. 3, the display section 15 includes the input sections 50 for input of a location on the screen 16 as a contact location by a touch on the screen 16.

In the example illustrated in FIG. 3, the input sections 50 are, for example, operation buttons. In more detail, the main screen MG, which is a menu screen, includes a print button 51, a scan button 52, and a copy button 53 as the input sections 50. When a user touches any one of the buttons 51 to 53, the display switches to a sub screen, which is a lower screen corresponding to the touched button. In more detail, when the user touches the print button 51 and operates it, the display switches to a print setting screen (not illustrated). In addition, when the user touches the scan button 52 and operates it, the display switches to a scan setting screen (not illustrated). Furthermore, when the user touches the copy button 53 and operates it, the display switches to a copy setting screen (not illustrated).

The main screen MG also includes an operation button 54, 55 as the input section 50. The operation button 54, 55 may be constituted by an instruction button operated for providing an instruction to the multi-function printer 11, a switching button operated for switching to another sub screen (not illustrated), which is a screen lower than the main screen MG, or another button. The operation button 54, may also be a shutdown button, selection button, or another button.

Examples of the other sub screen include a maintenance screen that is operated when maintenance is performed and a setting registration screen that is operated for registration of various settings. The sub screen that is not illustrated constitutes an example of the display content. In such a manner, in the present embodiment, a plurality of display screens are included as the display content of the screen 16. The display content of the screen 16 is switched to one of the plurality of display screens. The hierarchical levels of the sub screens with respect to the main screen MG are not limited to two levels and may be three levels or four or more levels. In addition, a configuration without a sub screen may be used.

The multi-function printer 11 has, as an operation mode of the display section 15, a cleanup management mode that encourages the user to carry out cleanup of the screen 16. The multi-function printer 11 may be configured to switch between the on and off states of the cleanup management mode. For example, an operation button for switching between the on and off states of the cleanup management mode may be provided on the main screen MG. In addition, the multi-function printer 11 may be communicatively coupled to a host device via a network. The configuration may also be such that the cleanup management mode is switched between the on and off states by operating an input operation section, such as a keyboard or a mouse, of the host device. The host device is communicatively coupled to the multi-function printer 11 in order for a plurality of users who use the multi-function printer 11 to issue an instruction for printing or reading an original document. The host device may be a personal computer (PC), tablet PC, cellular telephone, smartphone, or another device. The cleanup management mode is not limited to being switchable between the on and off states and may be a mode that is activated at any time if the multi-function printer 11 is powered on.

In addition, in FIG. 3, a message MS is displayed. Examples of the message MS include a message notifying the user of the operating state of the multi-function printer 11, a message prompting the user to perform an operation, and a message informing the user how to operate the multi-function printer 11. The message notifying the user of the operating state includes a message notifying that printing, scanning, or copying is being performed. In FIG. 3, although the message MS is presented using, by way of example, Western characters, the message MS may be presented in any language.

In addition, the main screen MG, which is one of the display screens, includes a background BG. The background BG is not the input section 50, and therefore if the user touches the region of the background BG, the touch is not detected as an operation. The message MS is displayed and superimposed on the background BG (for example, the layer of the background BG) such that the message MS appears closer to the viewer than the background BG. A keyboard may be displayed on the screen 16 and configured to input characters and character strings. In this case, the keyboard displayed on the screen 16 is an example of the input section.

The multi-function printer 11 has the cleanup management mode that changes the display content to encourage the user to carry out cleanup of the screen 16. In the cleanup management mode, the multi-function printer 11 according to the present embodiment performs the first display control process for reducing the degree of visibility of the display content so as to encourage cleanup of the screen 16 to be carried out by the user. To carry out cleanup of the screen 16, the user sets the multi-function printer 11 to a cleanup perform mode by operating the operation section 21 or a given input section 50 on the screen. The management of this mode is performed by the controller 20. As described above, the multi-function printer 11 according to the present embodiment may switch between the on and off states of the cleanup management mode. For example, when the operation section 21 or the given input section 50 on the screen 16 is operated by the user or a serviceman, the controller 20 causes the screen 16 to display a switching screen (not illustrated) for switching between the on and off states of the cleanup management mode. The controller 20 switches between the on and off states of the cleanup management mode based on an operation signal produced when the user selects either the on state or the off state on the switching screen.

In the cleanup management mode, the multi-function printer 11 according to the present embodiment performs the first display control process that reduces the degree of visibility of the display content so as to encourage cleanup of the screen 16 to be carried out by the user.

At least one of the factors indicating the degree of contamination of the screen 16 since the previous screen cleanup is used as a parameter. The controller 20 accumulates the value of at least one parameter since the previous screen cleanup and, in accordance with the accumulated value of the parameter, reduces the degree of visibility of display content displayed on the screen 16. According to the present embodiment, it may be said that the parameter is at least one factor in which the larger the accumulated value since the previous cleanup of the screen 16, the closer the next timing of cleanup of the screen 16.

While performing the first display control process, the controller 20 determines the accumulated value of the values of the parameter indicating the degree of contamination of the screen 16 and, in accordance with the accumulated value of the parameter, stepwise or continuously reduces the degree of visibility of the display content displayed on the screen 16.

The at least one parameter includes at least one of an elapsed time since the previous cleanup, the number of operations in touch with the screen performed since the previous cleanup, an operation time period, or the number of persons who approached the multi-function printer 11 since the previous cleanup.

Examples of the parameter indicating the degree of contamination are as follows:
 (a) an elapsed time since the previous screen cleanup,
 (b) the number of operations in touch with the screen performed since the previous screen cleanup,
 (c) an operation time period since the previous screen cleanup, and
 (d) the number of persons who approached the multi-function printer 11 since the previous screen cleanup.

At least one of these examples (a) to (d) is used as a parameter. A single parameter, two or three parameters selected from the examples (a) to (d), or all of the four examples may be used. The degree of contamination used herein is not only the degree of dirt on the screen 16 but also include the degree of contamination by virus, mold, or the like on the screen 16.

The controller 20 according to the present embodiment is configured to determine an accumulated value for each of all the four parameters.

The first timer 31 measures an elapsed time since the previous screen cleanup. The first timer 31 counts the number of clock pulses from a clock circuit (not illustrated) in the computer 30, time measurement pulses produced from the clock pulses, or the number of pulse edges of the clock pulses or the time measurement pulses, thereby measuring an elapsed time since the previous screen cleanup.

The second timer 32 measures an operation time period taken for operating the screen 16 since the previous screen cleanup. For clock pluses from a clock circuit (not illustrated) in the computer 30 in a time period in which operations on the screen 16 are detected or time measurement pulses produced from the clock pulses, the second timer 32 counts the number of clock pluses or the number of pulse edges. This operation time period is an accumulated value (accumulated time period) of operation time periods taken for operating the screen 16 since the previous screen cleanup.

The first counter 33 counts the number of operations in touch with the screen 16 performed since the previous screen cleanup. The number of operations used herein is the number of times the input sections 50, which are regions of the screen 16 in which the user may input an instruction to the multi-function printer 11, are operated. The number of operations may be said to be the number of times that the controller 20 receives input through a user operation of the input section 50.

The second counter 34 counts the number of persons who approached the multi-function printer 11 since the previous screen cleanup. The controller 20 performs an incremental process that increases the value of the second counter 34 by one each time the first sensor 25 detects a person.

Figure 7:
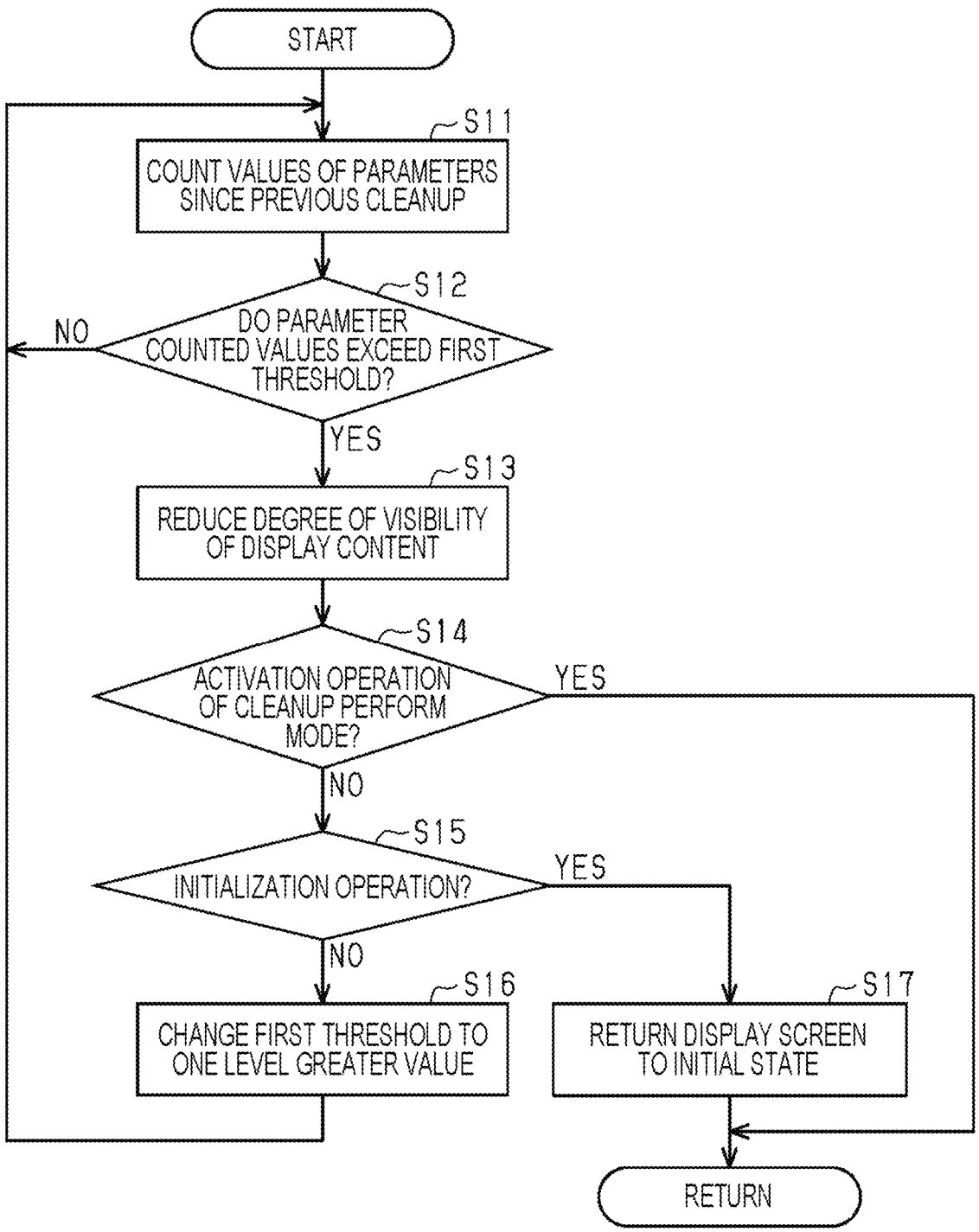
FIG. 7 is a flowchart illustrating a first display control process.

The computer 30 in the controller 20 executes the first program illustrated by the flowchart in FIG. 7, of the program PR stored in the storage 36, to perform the first display control process. The computer 30 also executes the second program illustrated by the flowchart in FIG. 8, of the program PR stored in the storage 36, to perform the second display control process.

The first threshold SV1 is used for the first display control process that reduces the degree of visibility of display content stepwise or continuously from the initial state (refer to FIG. 3). In the first display control process according to the present embodiment, the degree of visibility of display content is reduced stepwise from the initial state. The first threshold SV1 is reference data including a plurality of thresholds composed of a plurality of numerical values having different values. In the first threshold SV1, the thresholds in the reference data are used sequentially from the smallest threshold. When the accumulated value of the parameter exceeds the first threshold SV1, the controller 20 reduces the degree of visibility of display content displayed on the screen 16 by one step. As the accumulated value of the parameter increases, the controller 20 successively performs this process for the plurality of thresholds having different values included in the first threshold SV1, thereby stepwise reducing the degree of visibility of display content of the screen 16.

The second threshold SV2 is used for the second display control process that, in the cleanup perform mode, cleans up the screen 16 with the reduced degree of visibility of display content so as to increase the degree of visibility of display content. In the second display control process according to the present embodiment, the degree of visibility of display content is increased stepwise until returning to the initial state. The second threshold SV2 is reference data composed of a plurality of numerical values having different values. In the second threshold SV2, which is composed of numerical values having different values, the numerical values are used sequentially from the smallest value.

Figure 4:
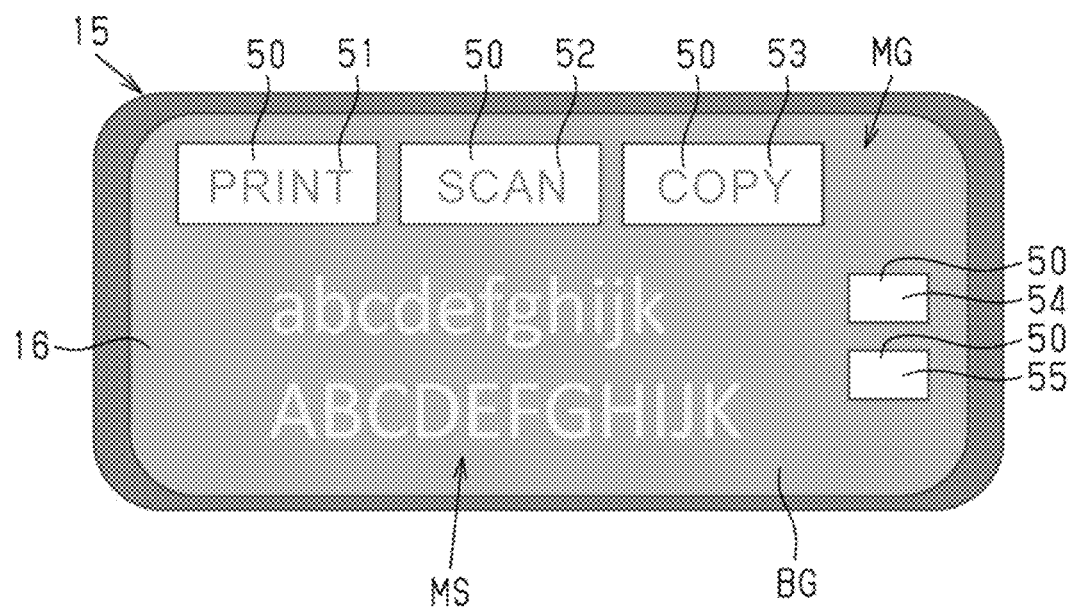
FIG. 4 is an illustrative diagram depicting the main screen with a low degree of visibility.
Figure 5:
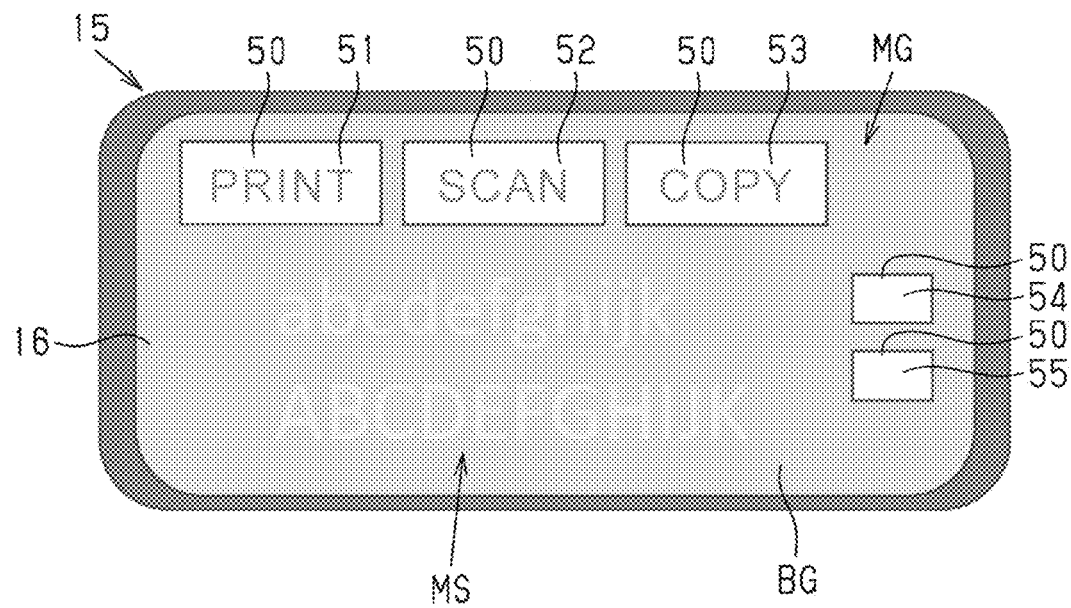
FIG. 5 is an illustrative diagram depicting the main screen with the lowest degree of visibility.
Figure 6:
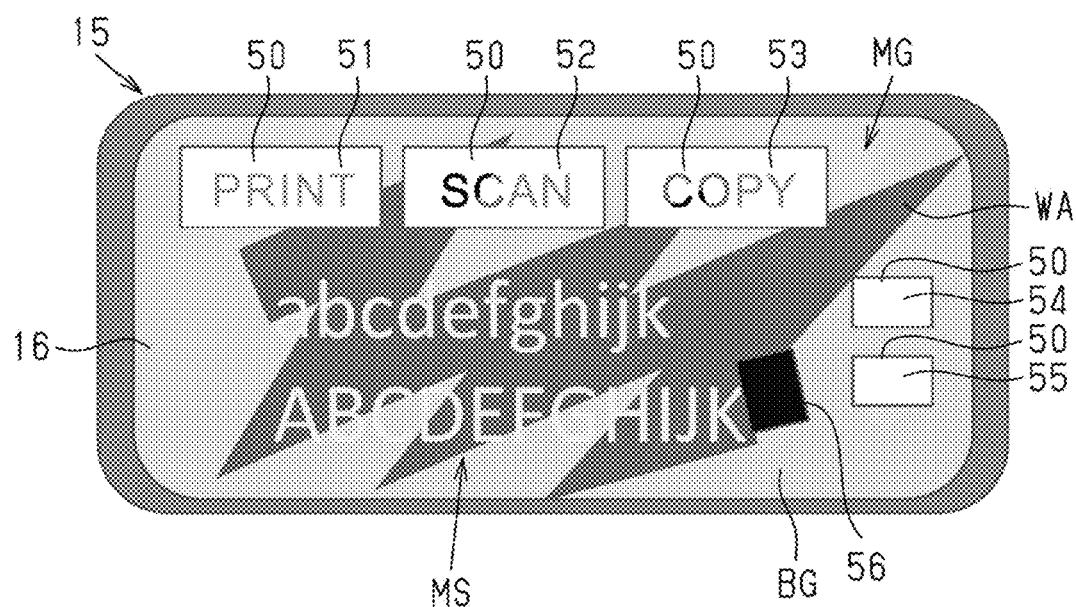
FIG. 6 is an illustrative diagram illustrating a display control process during cleanup of the screen of the display section.

Next, with reference to FIGS. 4 to 6, a display control process that the computer 30 performs will be described. Control of the display content of the screen 16 of the display section 15 performed by the controller 20 is performed, in more detail, by the computer 30 in the controller 20. The computer 30 performs the display control process by executing the program PR stored in the storage 36. The program PR includes a first display control process program illustrated by the flowchart in FIG. 7 and a second display control process program illustrated by the flowchart in FIG. 8.

Next, the cleanup management mode and the cleanup perform mode will be described. When the cleanup management mode is in the on state, the multi-function printer 11 reduces the degree of visibility of display content displayed on the screen 16 of the display section 15. When the cleanup perform mode is in the on state, the multi-function printer 11 may increases the degree of visibility of display content displayed on the screen 16 of the display section 15. Therefore, in the cleanup management mode, when the degree of visibility of display content of the screen 16 is reduced, the user carries out cleanup of the screen 16 to increase the degree of visibility of the display content. Therefore, in the cleanup management mode, the controller 20 may timely encourage the user to carry out cleanup of the screen 16 by reducing the degree of visibility of display content of the screen 16 as the contamination of the screen 16 increases.

Cleanup Management Mode

First, the cleanup management mode will be described. According to the present embodiment, in the cleanup management mode, the controller 20 reduces the degree of visibility of display content of the screen 16 based on an accumulated value of the parameter. In more detail, the controller 20 reduces the degree of visibility of the display content when the accumulated value of the parameter exceeds a threshold. According to the present embodiment, the controller 20 reduces the degree of visibility of the display content by one step each time the accumulated value of the parameter exceeds the first threshold SV1. The controller 20 changes the first threshold SV1 to a value that is one level greater than the current value each time the accumulated value of the parameter exceeds the first threshold SV1. Thus, the controller 20 reduces the degree of visibility of the display content stepwise with an increase in the accumulated value of the parameter. The first threshold SV1 may be a single threshold such that the switch between different degrees of visibility of display content is performed in two steps.

The multi-function printer 11 may include a threshold change operation section that is operated by a user to enable the threshold to be changed. In the present embodiment, one of operation buttons 54 and 55, which are the input sections 50, corresponds to an example of the threshold change operation section. For example, one of the operation buttons 54 and 55 in the main screen MG illustrated in FIG. 3 corresponds to an example of the threshold change operation section. For example, assuming that the operation button 55 is an example of the threshold change operation section, when the user operates the operation button 55 by touching it, a threshold change screen (not illustrated) is displayed as a sub screen. The user changes the first threshold SV1 by performing a touch operation on the threshold change screen. In addition, the operation section 21 that is a mechanical switch may be, by way of example, the threshold change operation section. Furthermore, the first threshold SV1 may be changed by operating an input operation section of a host device. For the first threshold SV1, a plurality of values are set at regular intervals. The user may change, for example, the smallest value of the first threshold SV1 and the regular interval of the first threshold SV1.

The controller 20 obtains a total accumulated value of a plurality of parameters using a conversion formula between the plurality of parameters and determines whether the accumulated value exceeds a threshold.

Here, the plurality of parameters may be employed. The respective accumulated values of the plurality of parameters are denoted by a, b, c . . . , and the respective coefficients in accordance with the contributions of the parameters are denoted by A, B, C . . . . One accumulated value in which the respective accumulated values of a plurality of parameters are converted into a single value is determined as a combined value of the value obtained by multiplying the accumulated value of each parameter by a coefficient. That is, an accumulated value F of parameters is calculated by $F=A\times a+B\times b+C\times c+\ldots$.

For example, one hour, which is an elapsed time, and one operation, which is the number of operations, are evaluated equally. In this case, the respective coefficients for the parameter of the elapsed time and for the parameter of the number of operations are set to the same value. In addition, five persons, which is the number of persons who approached the multi-function printer 11, and one operation, which is the number of operations, are evaluated equally. In this case, the coefficient by which the parameter of the number of operations is multiplied is set to five times the coefficient by which the parameter of the number of persons who approached the multi-function printer 11 is multiplied.

In addition, the controller 20 may correct the accumulated value of parameters by multiplying the accumulated value by a coefficient in accordance with a detected value obtained by the second sensor 26 or may change the first threshold SV1, which is an example of thresholds, based on a detected value obtained by the second sensor 26. In more detail, the controller 20 may correct the accumulated value of parameters based on at least one of the temperature, humidity, dust amount, or oil content amount of the ambient environment of the multi-function printer 11 or the body temperature of the operator, which is a detected value of the second sensor 26. Alternatively, the controller 20 may correct the first threshold SV1 based on at least one of the temperature, humidity, dust amount, or oil content amount of the ambient environment of the multi-function printer 11 or the body temperature of the operator, which is a detected value of the second sensor 26.

The computer 30 in the controller 20 according to the present embodiment executes the first display control program illustrated by the flowchart in FIG. 7 upon turn-on of the cleanup management mode. Thereby, the computer 30 performs the first display control process that reduces the degree of visibility of display content of the screen 16 stepwise or continuously with an increase in the contamination of the screen 16.

Cleanup Perform Mode

According to the present embodiment, in the cleanup perform mode, the controller 20 increases the degree of visibility of display content of the screen 16 based on the area of a cleaned region WA (refer to FIG. 6), which is a wiped region where the user has wiped off the screen 16. In more detail, the controller 20 increases the degree of visibility of the display content by one step each time a cleaned area, which is the area of the cleaned region WA, exceeds the second threshold SV2. The controller 20 changes the second threshold SV2 to a value that is one level greater than the current value each time the cleaned area exceeds the second threshold SV2. Thus, with an increase in the cleaned area, the controller 20 increases the degree of visibility of display content stepwise until the degree of visibility of display content returns to the initial state.

The second threshold SV2 may have a configuration in which the second threshold SV2 is made variable by an input operation of the user. For example, the user may change the second threshold SV2 by operating one of the operation section 21, the operation button 54, 55 on the screen 16, and an input operation section of the host device. For the second threshold SV2, for example, a plurality of values are set at regular intervals. The user may change, for example, the smallest value of the second threshold SV2 and the regular interval of the second threshold SV2.

Figure 8:
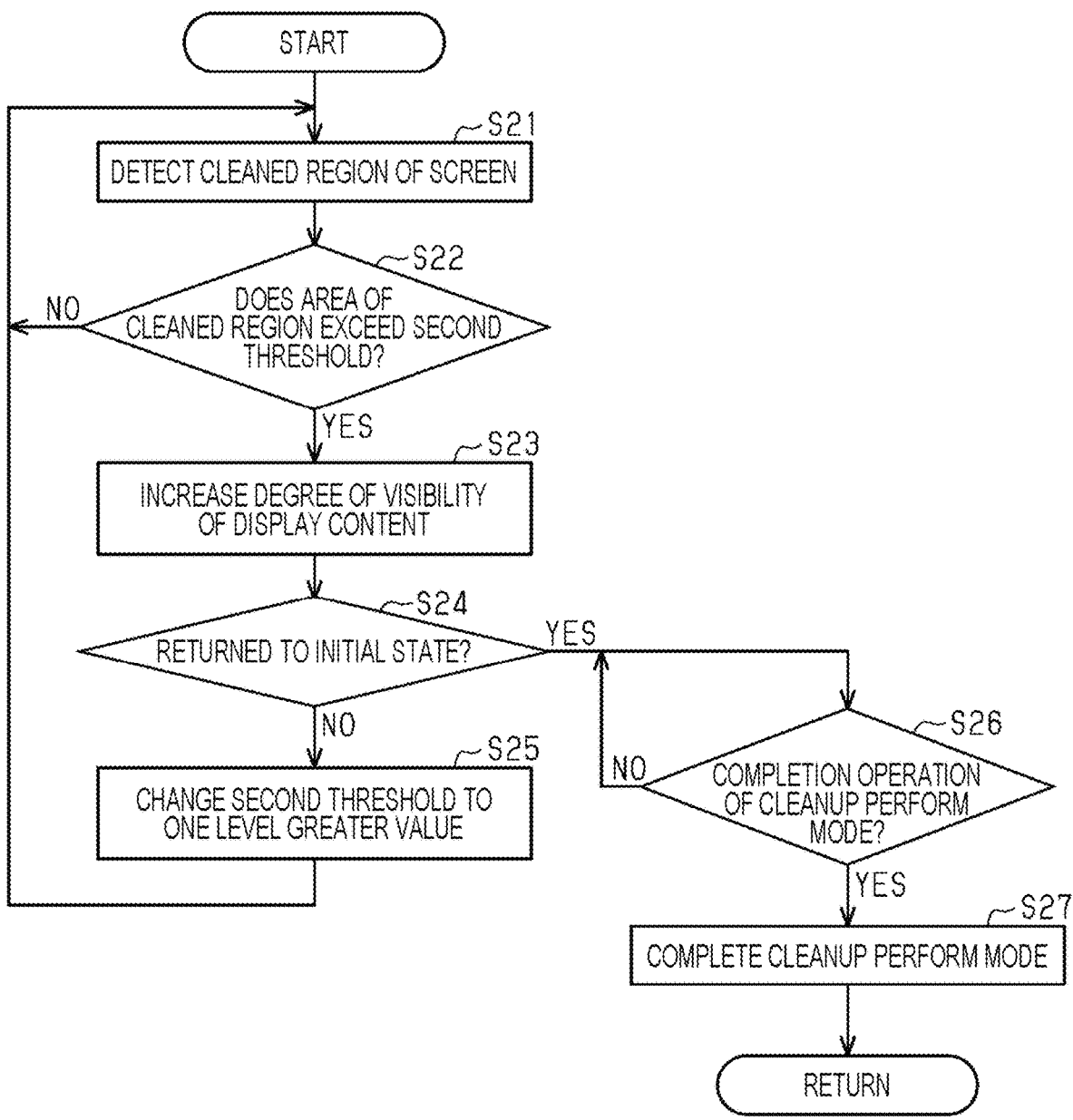
FIG. 8 is a flowchart illustrating a second display control process.

The computer 30 in the controller 20 according to the present embodiment executes a second display control program illustrated by the flowchart in FIG. 8 upon turn-on of the cleanup perform mode. Thereby, when cleanup of the screen 16 is carried out, the controller 20 returns the degree of visibility to the initial state illustrated in FIG. 3. According to the present embodiment, the controller 20 stepwise or continuously increases the degree of visibility as cleanup of the screen 16 proceeds. In more detail, as wiping of screen 16 proceeds, the computer 30 performs the second display control process for stepwise or continuously increasing the degree of visibility of display content of the screen 16 until the degree of visibility of display content returns to the initial state. In addition, according to the present embodiment, the controller 20 increases the degree of visibility of a region of the screen 16 in which cleanup is finished. At this point, the controller 20 obtains locations at which the user has wiped off (cleaned) the screen 16 based on detection signals from the contact detector 24 and, using the obtained wiped locations, recognizes the region in which cleanup is finished.

Operations of Embodiment

Next, the operations of the multi-function printer 11 according to the present embodiment will be described.

The first display control process and the second display control process performed by the computer 30 in the controller 20 will be described below. The computer 30 performs the first display control process illustrated by the flowchart in FIG. 7 in the cleanup management mode during power-on. With reference to FIGS. 3 to 5 and FIG. 7, the first display control process will be described below.

Initially, in step S11, the computer 30 counts the values of parameters since the previous cleanup. For example, the first timer 31 measures an elapsed time since the previous cleanup. The second timer 32 measures an operation time period taken for operating the screen 16 since the previous cleanup. The first counter 33 counts the number of operations in touch with the screen 16 performed since the previous cleanup. The second counter 34 counts the number of persons who approached the multi-function printer 11 since the previous cleanup. In this example, the computer 30 counts four parameters. In the storage 36, the first threshold SV1 may be stored for each parameter, or the counted values of a plurality of parameters are converted to a single accumulated value by a conversion formula using a weight coefficient of each parameter and the first threshold SV1 may be stored for the accumulated value. Although, in the example illustrated in FIG. 2, at least one parameter includes a plurality of parameters, only a single parameter may be used. In this case, only the single parameter may be any one of an elapsed time since the previous cleanup, an operation time period since the previous cleanup, the number of operations since the previous cleanup, and the number of persons who approached the multi-function printer 11 since the previous cleanup. In addition, the parameters may be two or three of the elapsed time, operation time period, number of operations, and number of persons who approached the multi-function printer 11 since the previous cleanup.

In step S12, the computer 30 determines whether the counted values of parameters exceed the first threshold. For example, in the case of the single parameter, it is determined whether the counted value (accumulated value) of the single parameter exceeds the first threshold SV1. In addition, in the case of two or more parameters, that is, a plurality of parameters, it is determined whether an accumulated value to which the counted values (accumulated values) of the plurality of parameters are converted as a single accumulated value using a conversion formula exceeds the first threshold SV1. If the counted values of parameters do not exceed the first threshold SV1, the process returns to step S11, where counting is performed repeatedly until it is determined in step S12 that the counted values of parameters exceed the first threshold SV1. However, if it is determined that the counted values of parameters exceed the first threshold SV1, the process proceeds to step S13.

In step S13, the computer 30 reduces the degree of visibility of the display content. For example, the degree of visibility of display content of the screen 16 is reduced by decreasing the display density from that of the display content of the screen 16 illustrated in FIG. 3 to that of the display content of the screen 16 illustrated in FIG. 4.

In step S14, the computer 30 determines whether an activation operation of the cleanup perform mode is present. If the activation operation is present, this routine terminates; however, if the activation operation is absent, the process proceeds to step S15.

In step S15, the computer 30 determines whether an initialization operation is present. The initialization operation used herein is an operation of forcibly returning the display content of the screen 16 to the initial state illustrated in FIG. 3 even without cleaning up the screen 16 in the cleanup perform mode. If the initialization operation is present, the process proceeds to step S17; however, if the initialization operation is absent, the process proceeds to step S16.

In step S16, the computer 30 changes the first threshold to a value that is one level greater than the existing value. That is, since the counted values (accumulated values) of parameters exceed the first threshold SV1 in step S12 and are greater than the existing first threshold SV1, the first threshold SV1 is changed to a value that is one level greater than the existing value so that the first threshold SV1 becomes greater than the current counted values.

In step S17, the computer 30 returns the display screen to its initial state. That is, in response to receiving an initialization operation performed by the user, the computer 30 returns the display screen, which is the display content of the screen 16, to the initial state.

After changing the first threshold SV1 to a value that is one level greater than the existing value in step S16, the computer 30 returns to step S11. Thereafter, the computer 30 repeats steps S11 to S16. As a result, the degree of visibility of display content of the screen 16 is further reduced by decreasing the display density from the display content of the screen 16 illustrated in FIG. 4 to the display content of the screen 16 illustrated in FIG. 5. Thus, with an increase in contamination of the screen 16, the display density of the display screen (for example, the main screen MG) on the screen 16 decreases stepwise and thereby the degree of visibility of display content of the screen 16 is reduced stepwise. The degree of visibility of display content displayed on the screen 16 is reduced stepwise in the present embodiment but may be reduced continuously.

Since the degree of visibility of display content of the screen 16 is reduced stepwise in such a manner, the user carries out cleanup of the screen 16 at some timing to alleviate the difficulty in viewing the display content due to a low degree of visibility. To carry out cleanup of the screen 16, the user performs an activation operation to activate the cleanup perform mode. As a result, the computer 30 determines in step S14 that the activation operation is present and terminates the routine. In conjunction with the termination of the routine, a shift is made from the cleanup management mode to the cleanup perform mode. In response to the shift to the cleanup perform mode, the computer 30 performs the second display control process illustrated in FIG. 8.

Steps S11, S12, S13, and S16 in FIG. 7 correspond to an example of "at least in the cleanup management mode, using, as a parameter, at least one of an elapsed time, a number of operations, an operation time period, or a number of persons who approached the multi-function printer 11, since previous cleanup, accumulating a value of the parameter and, in accordance with an accumulated value of the parameter, reducing a degree of visibility of display content of the display section".

Next, with reference, for example, to FIGS. 3, 6, and 8, the second display control process will be described. When carrying out cleanup of the screen 16, the user switches the multi-function printer 11 to the cleanup perform mode by operating one of the operation section 21, the operation button 54, 55, and the input operation section of the host device. When the cleanup perform mode is activated, the computer 30 causes the input sections 50 on the display screen of the screen 16 to be inoperable. Therefore, even if the user wipes off the screen 16 using a cleaning cloth or the like, the input sections 50 will not be operated. As described below, in the cleanup perform mode, as the user wipes off the screen 16, the degree of visibility of the display content displayed on the screen 16 increases stepwise or continuously. When the user wipes off the screen 16, the processing of the display content is performed by the computer 30 performing the second display control process illustrated by the flowchart in FIG. 8. The second display control process will be described below with reference to FIG. 8.

Initially, in step S21, the computer 30 detects a cleaned region of the screen. When the user wipes off the screen 16, the cleaned region, which is a wiped region of the screen 16, is detected by the contact detector 24. That is, the computer 30 detects the cleaned region based on contact locations detected by the contact detector 24 of the display section 15. At this point, the computer 30 obtains the area (for example, the number of pixels) of the cleaned region by counting the number of pixels where contact is detected on the screen 16 of the display section 15.

In step S22, the computer 30 determines whether the area of the cleaned region WA exceeds the second threshold SV2. If the area of the cleaned region WA does not exceed the second threshold SV2, the computer 30 returns to step S21 and continues detection of the cleaned region WA of the screen 16 until the area of the cleaned region WA exceeds the second threshold SV2 in step S22. If the area of the cleaned region WA exceeds the second threshold SV2, the computer 30 proceeds to step S23.

In step S23, the computer 30 increases the degree of visibility of the display content. For example, the computer 30 increases the degree of visibility of the display content by one step. Before the shift to the cleanup perform mode, the densities of the background BG and characters of the display content are reduced as illustrated in FIGS. 4 and 5 and thereby the degree of visibility is reduced. As illustrated in FIG. 6, the cleaned region WA of the screen 16, in which the user has finished clean up by wiping the screen 16, has an increased degree of visibility. Accordingly, the user may recognize the region of the screen 16 in which cleanup has been finished. In addition, in the cleanup perform mode, the input sections 50 of the display content of the screen 16 are in a deactivated operation state in which even when the input section 50 is touched, the touch is not detected as an operation. Therefore, even when the user touches the input section 50 in the wiping process, the touch is not detected as an operation. Accordingly, the occurrence of wrong operations caused when the user touches the input section 50 with his finger or a wiping cloth during cleanup of the screen 16 may be reduced. In addition, when the user wipes off the screen 16, a wiping section 56 that moves following the wiping path of the user is displayed on the screen 16 as illustrated in FIG. 6. Note that the cleanup perform mode, in which operations are deactivated, may be removed by using a wiping cloth made of a material or having a treated surface with which the contact is not detected even when the wiping cloth comes into contact with the screen 16.

In step S24, the computer 30 determines whether the display screen is returned to the initial state. If the display screen is not returned to the initial state, the process proceeds to step S25; however, if the display screen is returned to the initial state, the process proceeds to step S26. In an intermediate stage of cleanup of the screen 16 between the start at which the user starts the cleanup and the completion at which the user has cleared (wiped off) the entire region of the screen 16, only a portion of the display content of the screen 16 is in the cleaned region WA as illustrated in FIG. 6, which is not in the initial state illustrated in FIG. 3. Accordingly, in the intermediate stage of cleanup, the computer 30 proceeds to step S25.

In step S25, the computer 30 changes the second threshold to a value that is one level greater than the existing value. That is, since, in step S22, the area (for example, the number of pixels) of the cleaned region WA exceeds the second threshold SV2 and has a value greater than the existing value of the second threshold SV2, the second threshold SV2 is changed to a value that is one level greater than the existing value such that the second threshold SV2 has a value greater than the value of the area of the current cleaned region WA.

After changing the second threshold SV2 to a value that is one level greater than the existing value in step S25, the computer 30 returns to step S21. Thereafter, the computer 30 repeats steps S21 to S25. As a result, as the cleanup of the screen 16 carried out by the user proceeds, the cleaned region WA, which has been returned to a high degree of visibility, increases stepwise as illustrated in FIG. 6. In the present embodiment, the cleaned region WA of the screen 16 in which a high degree of visibility is attained again due to wiping is increased stepwise. However, the cleaned region WA may be increased continuously.

In such a manner, the cleaned region WA of the screen 16 in which a high degree of visibility is attained again is increased, which enables the user to recognize at some timing that cleanup of the entire region of the screen 16 has been finished. After finishing the cleanup of the screen 16, the user performs a completion operation to finish the cleanup perform mode. For example, the user performs the completion operation of the cleanup perform mode by operating one of the operation section 21, the operation button 54, 55 on the screen 16, and the input operation section of the host device.

In step S26, the computer 30 determines whether the completion operation of the cleanup perform mode has been performed. If the completion operation of the cleanup perform mode is absent, the computer 30 waits until the completion operation is performed, and proceeds to steps S27 if it is determined that the completion operation is present.

In step S27, the computer 30 completes the cleanup perform mode. The user forgets to perform a completion operation of the cleanup perform mode in some cases, and therefore the computer 30 forcibly terminates the cleanup perform mode when no completion operation of the cleanup perform mode is received even if a certain time period has elapsed after the return of the display content to the initial state. Completion of the cleanup perform mode in such a manner results in return of the multi-function printer 11 to the cleanup management mode.

Steps S21, S22, S23, and S25 in FIG. 8 correspond to an example of "increasing the degree of visibility of the display content of the display section in accordance with a contact area detected as a result of cleanup of the screen".

According to the first embodiment, the following advantageous effects are obtained.

1-1. The multi-function printer 11, which is an example of the display apparatus, includes the display section 15 with the screen 16 and the controller 20 that controls the display content of the screen 16. The multi-function printer 11 includes the display section 15 including the input sections 50 for input of a location on the screen 16 as a contact location by a touch on the screen 16, and the controller 20 that controls the display section 15. At least one of the factors indicating the degree of contamination of the screen 16 since the previous screen cleanup is used as a parameter. In this case, the controller 20 accumulates the value of at least one parameter since the previous screen cleanup and, in accordance with the accumulated value of the parameter, reduces the degree of visibility of display content displayed on the screen 16. According to this configuration, since the degree of visibility of the display content is reduced based on an accumulated value of at least one parameter accumulated since the previous screen cleanup, the reduction in the degree of visibility may encourage the user to voluntarily carry out cleanup of the screen 16. Therefore, the frequency at which the screen 16 is left without being cleaned up may be reduced.

1-2. The at least one parameter includes at least one of an elapsed time since the previous screen cleanup, the number of operations in touch with the screen 16 performed since the previous screen cleanup, an operation time period, or the number of persons who approached the display apparatus since the previous screen cleanup. According to this configuration, since at least one of the elapsed time, the number of operations, the operation time period, or the number of persons who approached the display apparatus since the previous screen cleanup is used as a parameter, the user may be timely encouraged to voluntarily carry out cleanup of the screen 16.

1-3. The reduction in the degree of visibility is due to a change in display density. According to this configuration, the degree of visibility is reduced by a change in the display density on the screen 16. This makes it likely to encourage the user to voluntarily carry out cleanup of the screen 16.

1-4. The controller 20 returns the degree of visibility to its initial state when cleanup of the screen 16 is carried out. According to this configuration, the degree of visibility returns to the initial state when cleanup of the screen 16 is carried out. This makes it likely to encourage cleaning.

1-5. The controller 20 increases the degree of visibility stepwise or continuously as cleanup of the screen 16 proceeds. According to this configuration, as the cleanup of the screen 16 proceeds, the degree of visibility increases, which facilitates recognition of the degree of advancement of the cleanup.

1-6. The controller 20 increases the degree of visibility of a region of the screen 16 in which cleanup is finished. According to this configuration, the degree of advancement of cleanup of the screen 16 may be recognized by the user. For example, unfinished cleanup is less likely to occur.

1-7. The controller 20 has a cleanup management mode for encouraging cleaning of the screen 16. When the cleanup management mode is in the on state, the controller 20 performs a process of reducing the degree of visibility of display content in accordance with the accumulated value of the parameter. The multi-function printer 11 is configured to switch between the on and off states of the cleanup management mode. According to this configuration, the selection may be made when it is desired to encourage cleanup of the screen 16.

1-8. The controller 20 reduces the degree of visibility of the display content when the accumulated value of the parameter exceeds the threshold. According to this configuration, the degree of visibility of display content may be reduced stepwise in accordance with an accumulated value of the parameter. For example, the burden of processing of the controller 20 may be reduced.

1-9. The multi-function printer 11 includes a threshold change operation section configured to be operated by a user so as to change the threshold. According to this configuration, since the user may change the threshold by operating the threshold change operation section, the speed of reducing the degree of visibility may be adjusted. Therefore, the user may be encouraged at a more appropriate timing to carry out cleanup of the screen 16.

1-10. The controller 20 obtains a total accumulated value of a plurality of parameters by using a conversion formula for the plurality of parameters and determines whether the accumulated value exceeds a threshold. According to this configuration, since the total accumulated value of the plurality of parameters is appropriately obtained using the converted values, the degree of contamination of the screen 16 may be appropriately evaluated from a plurality of factors. Therefore, the user may be encouraged at a more appropriate timing to carry out cleanup of the screen 16.

1-11. The multi-function printer 11 includes a detector that detects at least one of the temperature, humidity, dust amount, or oil content amount of an ambient environment or the body temperature of an operator. The accumulated value of the parameter is corrected by multiplying the accumulated value by a coefficient in accordance with a detected value obtained by the detector, or the threshold is changed based on a detected value obtained by the detector. According to this configuration, the degree of contamination of the screen 16 is evaluated based on an accumulated value in consideration of at least one of the temperature, humidity, dust amount, or oil content amount of the ambient environment or the body temperature of the operator. Therefore, the user may be encouraged at a more appropriate timing to carry out cleanup of the screen 16.

1-12. In a display control method for a display apparatus including the display section 15 with the screen 16, the controller 20 performs the following (A) and (B). (A) At least in the cleanup management mode, using, as a parameter, at least one of an elapsed time, the number of operations, an operation time period, or the number of persons who approached a multi-function printer, since previous cleanup, the controller 20 accumulates the value of the parameter and, in accordance with the accumulated value of the parameter, reduces the degree of visibility of display content of the display section 15, and (B) increasing the degree of visibility of the display content of the display section 15 in accordance with a contact area detected as a result of cleanup of the screen 16. According to this display control method, as with the multi-function printer 11, which is an example of the display apparatus, the frequency at which the screen 16 is left without being cleaned up may be reduced.

1-13. A non-transitory computer-readable storage medium stores a display control program executed by the computer 30 included in a display apparatus including the display section 15 with the screen 16. The display control program, when executed by the computer 30, causes the computer 30 to execute the following steps A and B. Step A: At least in the cleanup management mode, using, as a parameter, at least one of an elapsed time, the number of operations, an operation time period, or the number of persons who approached the multi-function printer 11, since previous cleanup, the computer 30 is caused to accumulate the value of the parameter and to, in accordance with the accumulated value of the parameter, reduce the degree of visibility of display content of the display section 15. Step B: The computer 30 is caused to increase the degree of visibility of the display content of the display section 15 in accordance with a contact area detected as a result of cleanup of the screen 16. According to this display control program, as with the multi-function printer 11, which is an example of the display apparatus, the frequency at which the screen 16 is left without being cleaned up may be reduced.

Second Embodiment

Next, with reference to FIGS. 9 to 14, a second embodiment will be described. The basic configuration and electrical configuration of the multi-function printer 11 are similar to those in the first embodiment described above, and a description will be given below focusing on differences from the first embodiment.

The controller 20 reduces the degree of visibility of the display content at locations in accordance with operation locations of the user in the screen 16. In the first embodiment described above, the degree of visibility of the entire display content on the screen 16 is reduced stepwise or continuously. In contrast, in the second embodiment, the degree of visibility of the display content is partially reduced at locations in accordance with operation locations that the user has touched in the main screen MG, which is display content of the screen 16. In addition, in the first embodiment described above, the degree of visibility is reduced by changing the display density. In contrast, in the second embodiment, the degree of visibility is reduced by displaying obstacles.

Figure 9:
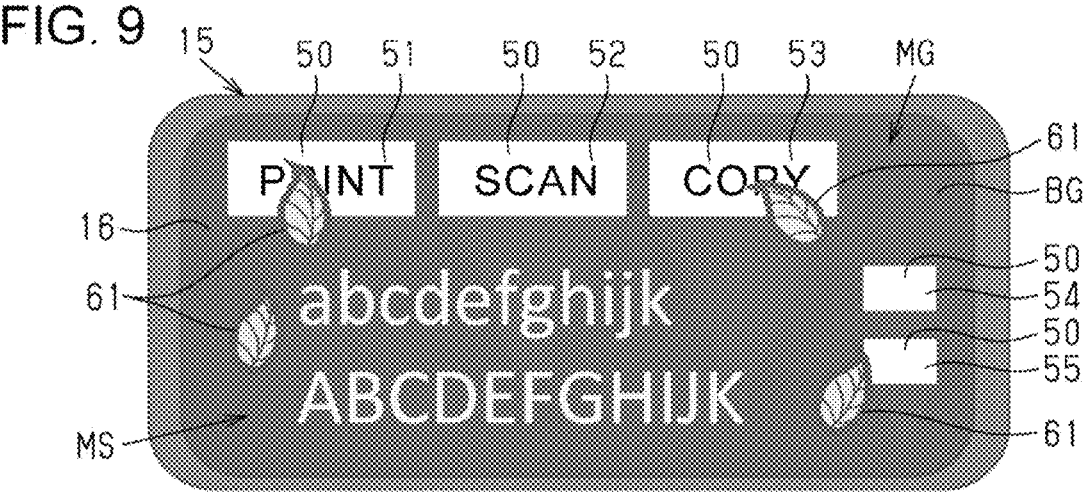
FIG. 9 is an illustrative diagram depicting a state in which the degree of visibility of a main screen displayed on a screen of a display section is low in an example of a second embodiment.

Specifically, as illustrated in FIG. 9, processing of displaying obstacles 61 at locations in accordance with operation locations of the user in the screen 16 is performed. In FIG. 9, the obstacles 61, which are, for example, fallen leaves, are displayed at locations in accordance with operation locations of the user. Therefore, the obstacles 61 are displayed at locations at which the user has touched the screen 16 with his finger for operating the input sections 50. As a result, the degree of visibility of the main screen MG, which is display content of the display section 15, is reduced.

Figure 10:
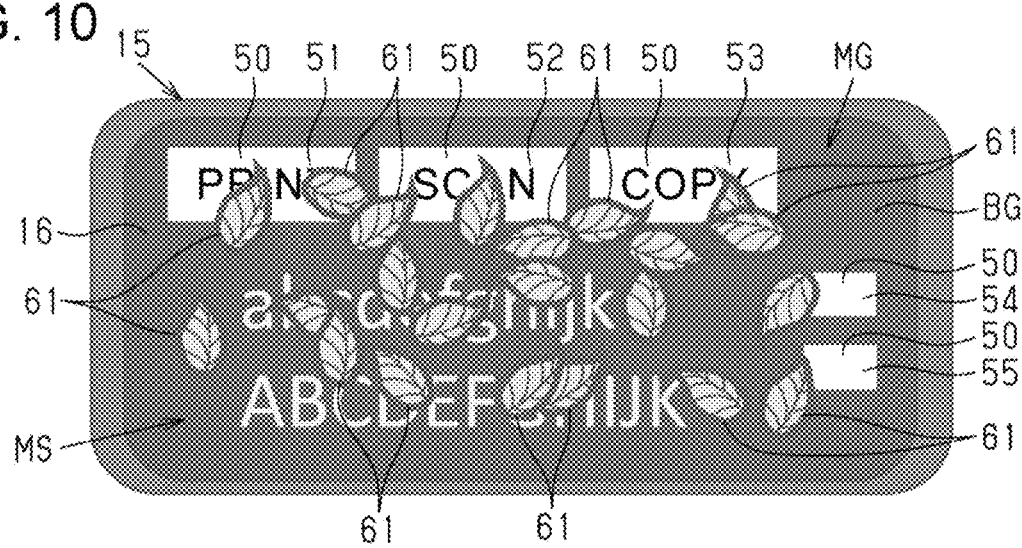
FIG. 10 is an illustrative diagram depicting a state in which the degree of visibility of the main screen is significantly low.

As illustrated in FIG. 10, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the number of obstacles 61 increases stepwise. For the user, the greater the number obstacles 61 on the screen 16, the more the degree of visibility of the main screen MG, which is display content, is reduced. The reduction in the degree of visibility of display content of the screen 16 in such a manner encourages the user to carry out cleanup of the screen 16.

When the degree of visibility of display content displayed on the screen 16 is reduced, the user cleans the screen 16 at some timing to return the degree of visibility of display content of the screen 16 to the initial state illustrated in FIG. 3.

Figure 11:
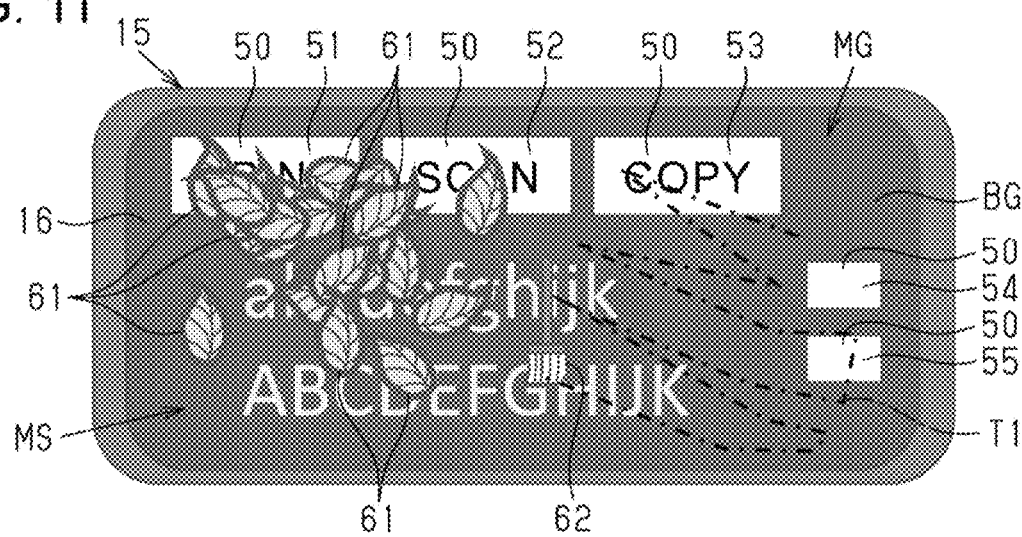
FIG. 11 is an illustrative diagram depicting a display control process when the main screen is wiped off.

In the example illustrated in FIG. 11, when the user wipes off the screen 16 for cleanup, a broom 62 displayed on the screen 16 moves along a wiping path T1, represented by a dash-dot line in FIG. 11, in which the user has wiped off the screen 16. The controller 20 displays an image in which the broom 62, which follows the user along the wiping path T1 in which the user has wiped off the screen 16, moves and sweeps the obstacles 61, which are fallen leaves, out of the wiped region. With the obstacles 61, which are fallen leaves, being swept out of the screen 16 by the broom 62, the display content of the screen 16 returns to the same initial state as in FIG. 3. In this way, when the user has finished wiping off the entire screen 16, the screen 16 returns to the initial state illustrated in FIG. 3.

When cleanup of the screen 16 is complete, the controller 20 returns the cleanup perform mode to the cleanup management mode by receiving a completion operation of the user or by a time limit.

Figure 12:
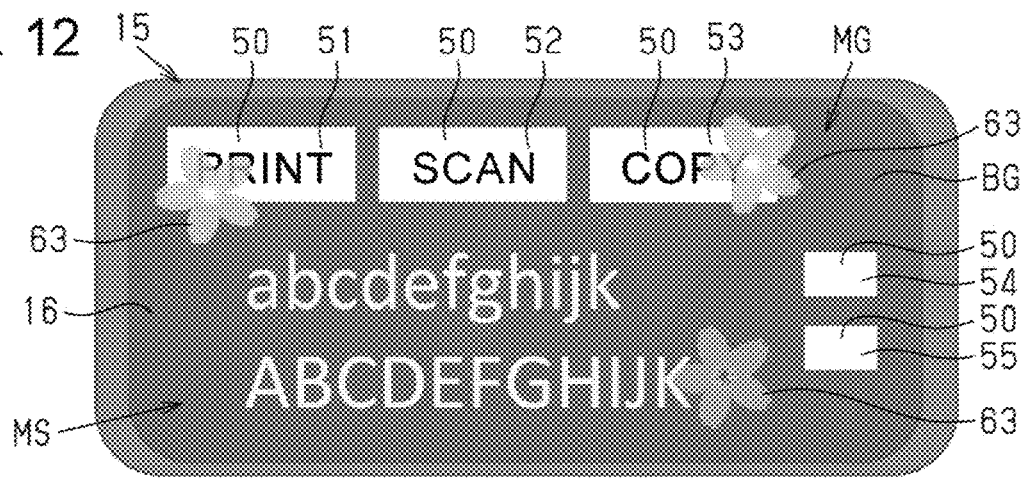
FIG. 12 is an illustrative diagram depicting a state in which the degree of visibility of the main screen displayed on the screen of the display section is low in another example of the second embodiment.
Figure 13:
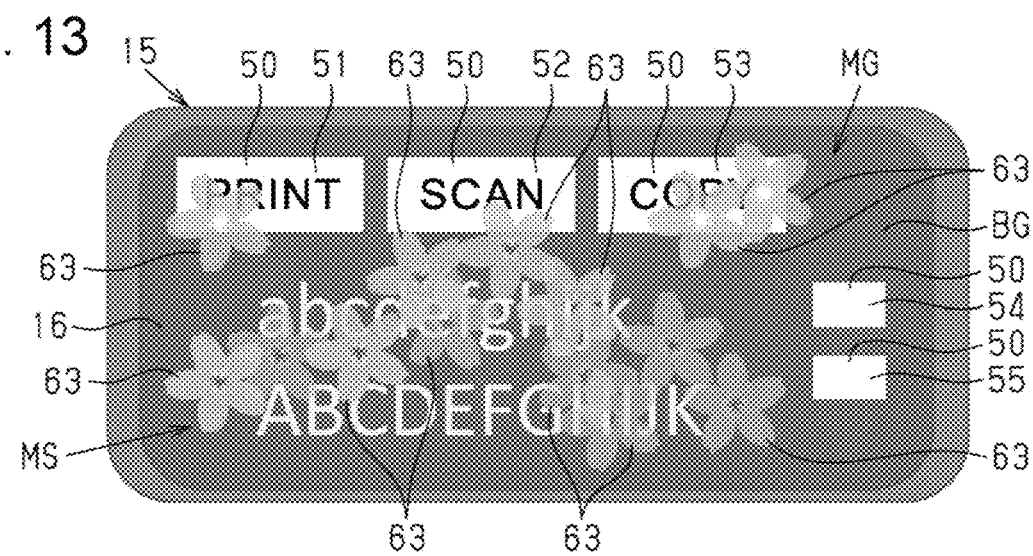
FIG. 13 is an illustrative diagram depicting a state in which the degree of visibility of the main screen is significantly low.
Figure 14:
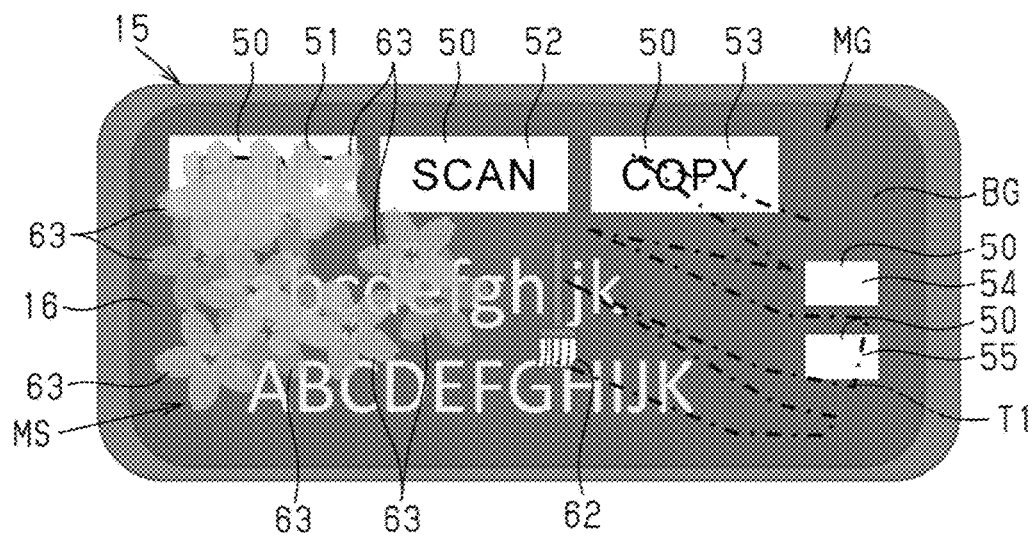
FIG. 14 is an illustrative diagram depicting a display control process when the main screen is wiped off.

In addition, as illustrated in FIGS. 12 to 14, obstacles 63 may be cherry flowers. Specifically, as illustrated in FIG. 12, processing of displaying the obstacles 63 at locations in accordance with operation locations of the user in the screen 16 is performed. In FIG. 12, the obstacles 63, which are, for example, cherry flowers, are displayed at locations in accordance with operation locations of the user. Therefore, the obstacles 63 are displayed at locations at which the user has touched the screen 16 with his finger for operating the input sections 50. As a result, the degree of visibility of the main screen MG, which is display content of the display section 15, is reduced.

As illustrated in FIG. 13, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the number of obstacles 63 increases stepwise. For the user, the greater the number obstacles 63 on the screen 16, the more the degree of visibility of the main screen MG, which is the display content, is reduced. The reduction in the degree of visibility of display content of the screen 16 in such a manner encourages the user to carry out cleanup of the screen 16.

When the degree of visibility of display content displayed on the screen 16 is reduced, the user cleans the screen 16 at some timing to return the degree of visibility of display content of the screen 16 to the initial state illustrated in FIG. 3.

In the example illustrated in FIG. 14, when the user wipes off the screen 16 for cleanup, the broom 62 displayed on the screen 16 moves along the wiping path T1, represented by a dash-dot line in FIG. 14, in which the user has wiped off the screen 16. The controller 20 displays an image in which the broom 62, which follows the user along the wiping path T1 in which the user has wiped off the screen 16, moves and sweeps the obstacles 63, which are cherry flowers, out of the wiped region. With the obstacles 63, which are cherry flowers, being swept out of the screen 16 by the broom 62, the display content of the screen 16 returns to the same initial state as in FIG. 3. In this way, when the user has finished wiping off the entire screen 16, the screen 16 returns to the initial state illustrated in FIG. 3.

When cleanup of the screen 16 is complete, the controller 20 returns from the cleanup perform mode to the cleanup management mode by receiving a completion operation of the user or by a time limit.

The controller 20 may change the designs of obstacles 61 and 63 in accordance with the season including the date based on the current date information managed by an internal clock. For example, assuming from the current date information that the current season is the autumn, a fallen leaf design related to the autumn illustrated in FIGS. 9 to 11 is regarded as the obstacle 61. In addition, assuming from the current date information that the current season is the spring, a cherry flower design related to the spring illustrated in FIGS. 12 to 14 is regarded as the obstacle 61.

According to the second embodiment, the advantageous effects of 1-1, 1-2, and 1-4 to 1-13 in the first embodiment are obtained similarly, and additionally the following advantageous effects are obtained.

2-1. The controller 20 reduces the degree of visibility of the display content at locations in accordance with operation locations of the user in the screen 16. According to this configuration, the degree of visibility is more reduced at a location of the screen 16 at which the user performs an operation more frequently. This makes it more likely to encourage the user to voluntarily carry out cleanup of the screen 16.

2-2. The reduction in the degree of visibility includes display of the obstacle 61, 63. According to this configuration, the degree of visibility is reduced by displaying the obstacle 61, 63 on the screen 16. This makes it likely to encourage the user to voluntarily carry out cleanup of the screen 16.

Third Embodiment

Next, with reference to FIGS. 15 to 17, a third embodiment will be described. The basic configuration and electrical configuration of the multi-function printer 11 are similar to those in the first embodiment described above, and a description will be given below focusing on differences from the first embodiment.

The controller 20 reduces the degree of visibility of the display content at locations in accordance with operation locations of the user in the screen 16. In the first embodiment described above, the degree of visibility of the entire display content on the screen 16 is reduced stepwise or continuously. In contrast, in the third embodiment, as in the second embodiment, the degree of visibility of the display content is partially reduced at locations in accordance with operation locations that the user has touched in the main screen MG, which is display content of the screen 16. In addition, in the first embodiment described above, the degree of visibility is reduced by changing the display density. In the third embodiment, as in the first embodiment, the degree of visibility is reduced by changing the display density.

That is, in the third embodiment, the degree of visibility of the display content is partially reduced at locations in accordance with operation locations of the user in the screen 16 such that the process of reducing the degree of visibility is performed by performing a process of decreasing the display density.

Figure 15:
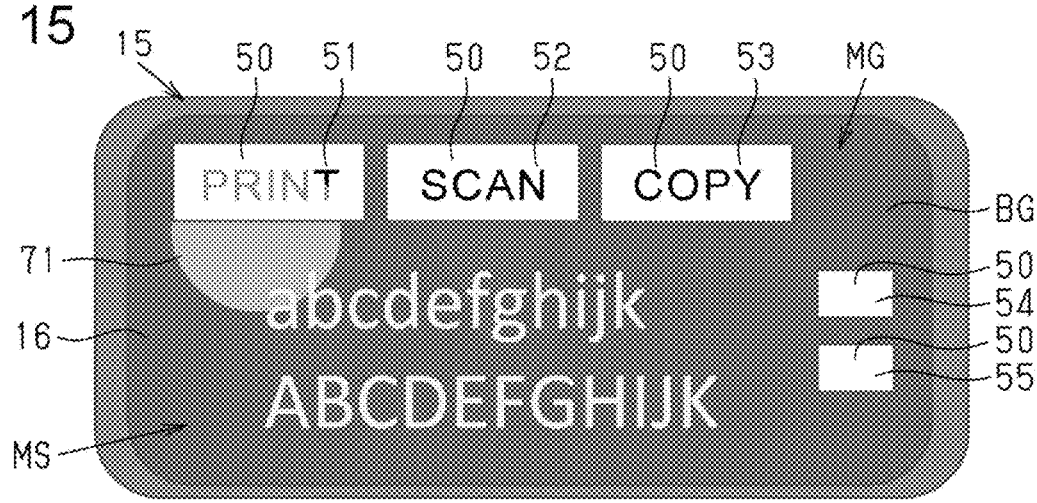
FIG. 15 is an illustrative diagram depicting a state in which the degree of visibility of a main screen displayed on a screen of a display section is low in a third embodiment.

Specifically, as illustrated in FIG. 15, processing of displaying a low density region 71 with a decreased display density is performed at a location in accordance with an operation location of the user in the screen 16. In FIG. 15, the low density region 71 having, for example, a circular shape is displayed at a location in accordance with an operation location of the user. Therefore, since the low density region 71 is displayed at a location at which the user has touched the screen 16 with, for example, his finger, the degree of visibility of the main screen MG, which is display content, is reduced.

Figure 16:
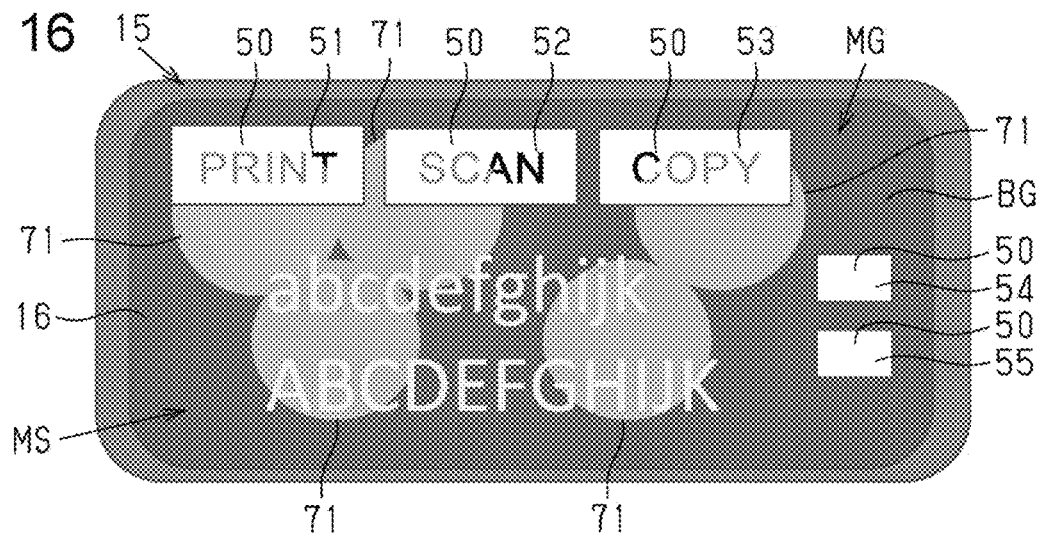
FIG. 16 is an illustrative diagram depicting a state in which the degree of visibility of the main screen is significantly low.

As illustrated in FIG. 16, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the number of low density regions 71 increases stepwise. For the user, the greater the number low density regions 71 on the screen 16, the more the degree of visibility of the main screen MG, which is display content, is reduced. The reduction in the degree of visibility of the display content displayed on the screen 16 in such a manner encourages the user to carry out cleanup of the screen 16.

When the degree of visibility of display content displayed on the screen 16 is reduced, the user cleans the screen 16 at some timing. When cleaning up the screen 16, the user changes the mode from the cleanup management mode to the cleanup perform mode. The user wipes off the screen 16 to carry out cleanup, thereby returning the degree of visibility of display content of the screen 16 to the initial state illustrated in FIG. 3.

Figure 17:
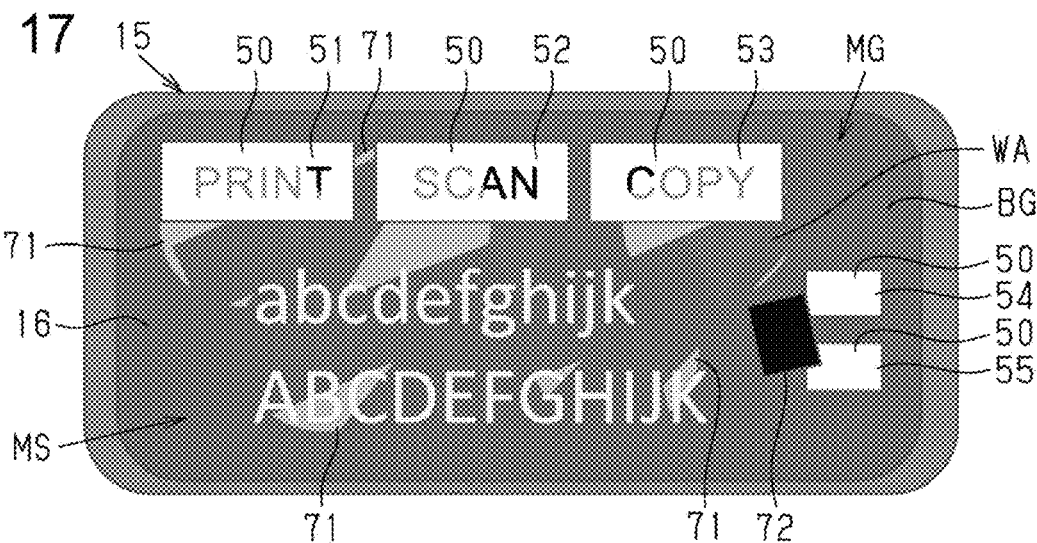
FIG. 17 is an illustrative diagram depicting a display control process when the main screen is wiped off.

In the example illustrated in FIG. 17, when the user wipes off the screen 16 for cleanup, a wiping section 72 is displayed on the screen 16 and the displayed wiping section 72 moves along a wiping path in which the user has wiped off the screen 16. The controller 20 returns a region where the user has wiped off the screen 16, that is, a region where the screen 16 is wiped off by the wiping section 72, which follows the user along the wiping path in which the user has wiped off the screen 16, to the same display density as the initial state. In this way, when the user has finished wiping off the entire screen 16, the screen 16 returns to the initial state illustrated in FIG. 3.

When cleanup of the screen 16 is complete, the controller 20 returns from the cleanup perform mode to the cleanup management mode by receiving a completion operation of the user or by a time limit.

According to the third embodiment, the advantageous effects of 1-1 to 1-13 in the first embodiment and the advantageous effects of 2-1 in the second embodiment are obtained similarly.

Fourth Embodiment

Next, with reference to FIGS. 18 to 20, a fourth embodiment will be described. The basic configuration and electrical configuration of the multi-function printer 11 are similar to those in the first embodiment described above, and a description will be given below focusing on differences from the first embodiment.

The controller 20 reduces the degree of visibility of the display content at locations in accordance with operation locations of the user in the screen 16. In the first embodiment described above, the degree of visibility of the entire display content on the screen 16 is reduced stepwise or continuously. In contrast, in the fourth embodiment, as in the second embodiment, the degree of visibility of the display content is partially reduced at locations in accordance with operation locations that the user has touched in the main screen MG, which is display content of the screen 16. In addition, in the fourth embodiment, as in the second embodiment, the degree of visibility is reduced by displaying an obstacle 73.

Figure 18:
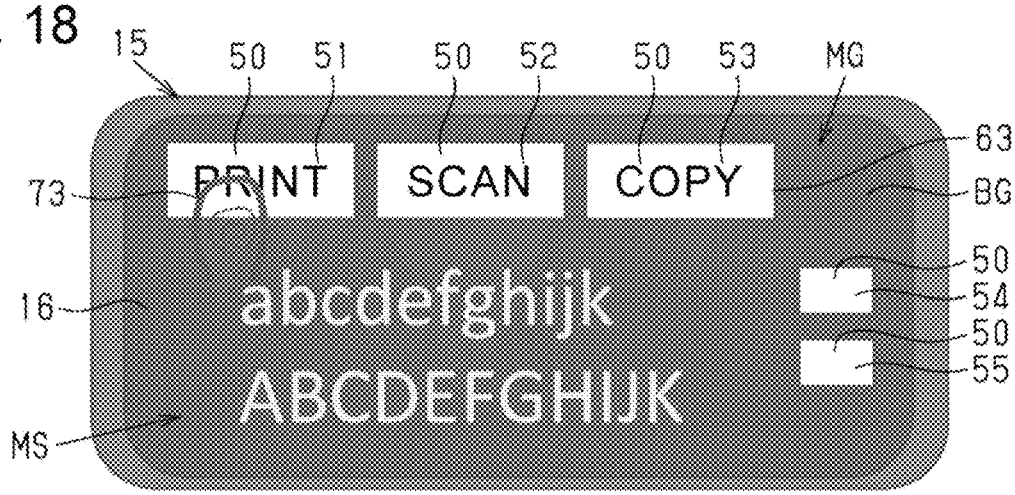
FIG. 18 is an illustrative diagram depicting a state in which the degree of visibility of the main screen displayed on the screen of the display section is low in a fourth embodiment.

Specifically, as illustrated in FIG. 18, processing of displaying the obstacle 73 at a location in accordance with an operation location of the user in the screen 16 is performed. In FIG. 18, the obstacle 73, which is, for example, a fingerprint, is displayed at a location in accordance with an operation location of the user. Therefore, since the obstacle 73 is displayed at a location at which the user has touched the screen 16 with, for example, his finger, the degree of visibility of the main screen MG, which is display content, is reduced.

Figure 19:
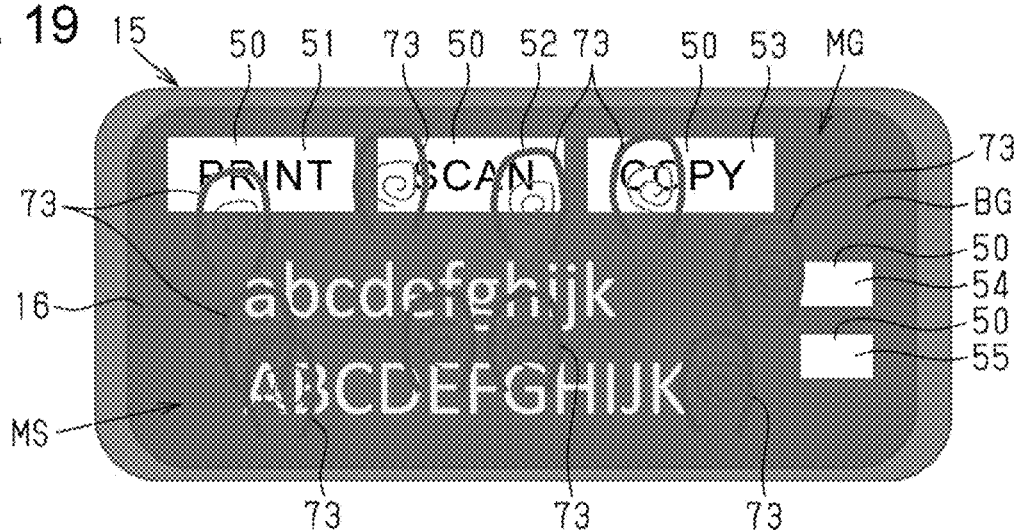
FIG. 19 is an illustrative diagram depicting a state in which the degree of visibility of the main screen is significantly low.

As illustrated in FIG. 19, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the number of obstacles 73 increases stepwise. For the user, the greater the number of the obstacles 73 on the screen 16, the more the degree of visibility of the main screen MG, which is display content, is reduced. The reduction in the degree of visibility of display content of the screen 16 in such a manner encourages the user to carry out cleanup of the screen 16.

In the present embodiment, since the obstacle 73 is displayed at a location at which a user has touched, a user may visually recognize which locations of the screen 16 a plurality of persons including another user have touched. For example, this enables the user to operate the input sections 50 at locations other than the location the other user has touched.

Furthermore, the controller 20 according to the present embodiment changes the display density of the obstacle 73 displayed at a touched location on the screen 16 such that the display density decreases with the passage of time following the display time point. Therefore, the user may estimate, from the display density of the obstacle 73, the time that has elapsed since another user or the like has touched the screen 16. Accordingly, the user may operate the input sections 50 on the screen 16 as far away as possible from the obstacles 73 having high display densities. For example, the user may be prevented from contracting a communicable disease through contact with the screen 16.

In the processing of controlling the display density of the obstacle 73, the controller 20 may separately manage respective elapsed times since the display of a plurality of obstacles 73 to individually change the display density of each of the obstacles 73 by using the respective elapsed time. In addition, the controller 20 may display all the obstacles 73 at the same display density in accordance with an elapsed time since the most recent display of the obstacle 73 among the plurality of obstacles 73.

When the degree of visibility of display content displayed on the screen 16 is reduced by the obstacles 73, the user cleans the screen 16 at some timing. When cleaning up the screen 16, the user changes the mode from the cleanup management mode to the cleanup perform mode. The user wipes off the screen 16 to carry out cleanup, thereby returning the degree of visibility of display content of the screen 16 to the initial state illustrated in FIG. 3.

Figure 20:
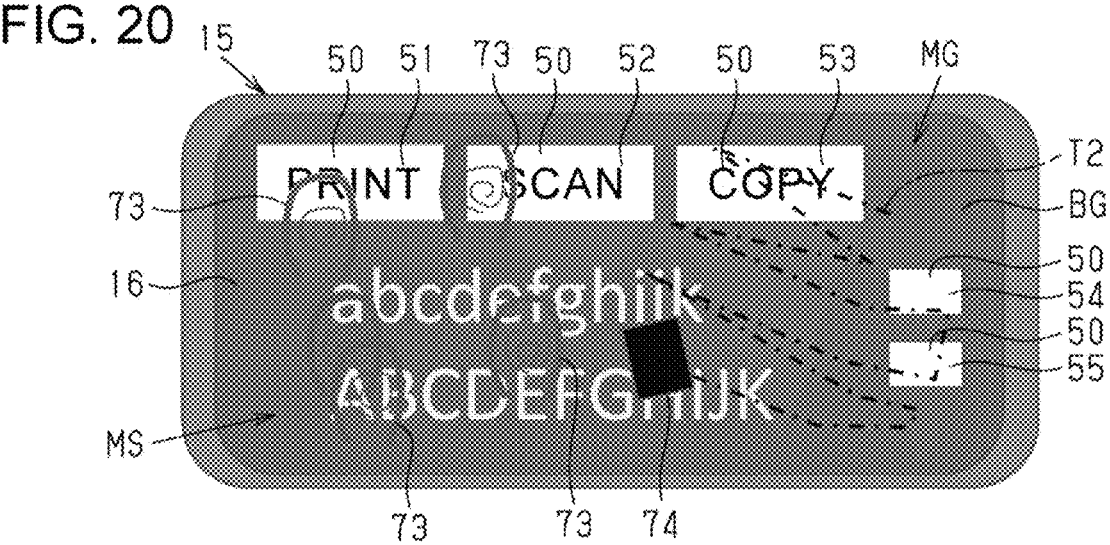
FIG. 20 is an illustrative diagram depicting a display control process when the main screen is wiped off.

In the example illustrated in FIG. 20, when the user wipes off the screen 16 for cleanup, a wiping section 74 displayed on the screen 16 moves along a wiping path T2, represented by a dash-dot line in FIG. 20, in which the user has wiped off the screen 16. The controller 20 displays an image in which the wiping section 74, which follows the user along the wiping path T2 in which the user has wiped off the screen 16, wipes off the obstacles 73, which are fingerprints, so that the obstacles 73 disappear. With the obstacles 73, which are fingerprints, being wiped off from the screen 16 by the wiping section 74, the display content of the screen 16 returns to the same initial state as in FIG. 3. In this way, when the user has finished wiping off the entire screen 16, the screen 16 returns to the initial state illustrated in FIG. 3.

When cleanup of the screen 16 is complete, the controller 20 returns from the cleanup perform mode to the cleanup management mode by receiving a completion operation of the user or by a time limit.

According to the fourth embodiment, the advantageous effects as in the second embodiment are obtained similarly, and additionally the following advantageous effects are obtained.

4-1. The controller 20 changes the display density of the obstacle 73 displayed at a touched location on the screen 16 such that the display density decreases with the passage of time following the display time point. Accordingly, the user may operate the input sections 50 on the screen 16 as far away as possible from the obstacles 73 having high display densities. For example, the user may be prevented from contracting a communicable disease via the screen 16.

Fifth Embodiment

Next, with reference to FIGS. 21 to 23, a fifth embodiment will be described. The basic configuration and electrical configuration of the multi-function printer 11 are similar to those in the first embodiment described above, and a description will be given below focusing on differences from the first embodiment.

The controller 20 accumulates the value of at least one parameter since the previous screen cleanup and, in accordance with the accumulated value of the parameter, reduces the degree of visibility of display content displayed on the screen 16.

In order to reduce the degree of visibility of the display content, the controller 20 decreases the sizes of the input sections 50 displayed on the screen 16. In the fifth embodiment, the degree of visibility is reduced by reducing a display region DA of the screen 16 in which a display screen is drawn. In the example illustrated in FIG. 21, the size of the main screen MG is changed to a smaller size by changing the display region DA to a smaller size. That is, the controller 20 changes the display sizes of the input sections 50 in the main screen MG to smaller sizes by reducing the display size of the main screen MG to a smaller size. This reduces the degree of visibility of display content of the screen 16.

Figure 21:
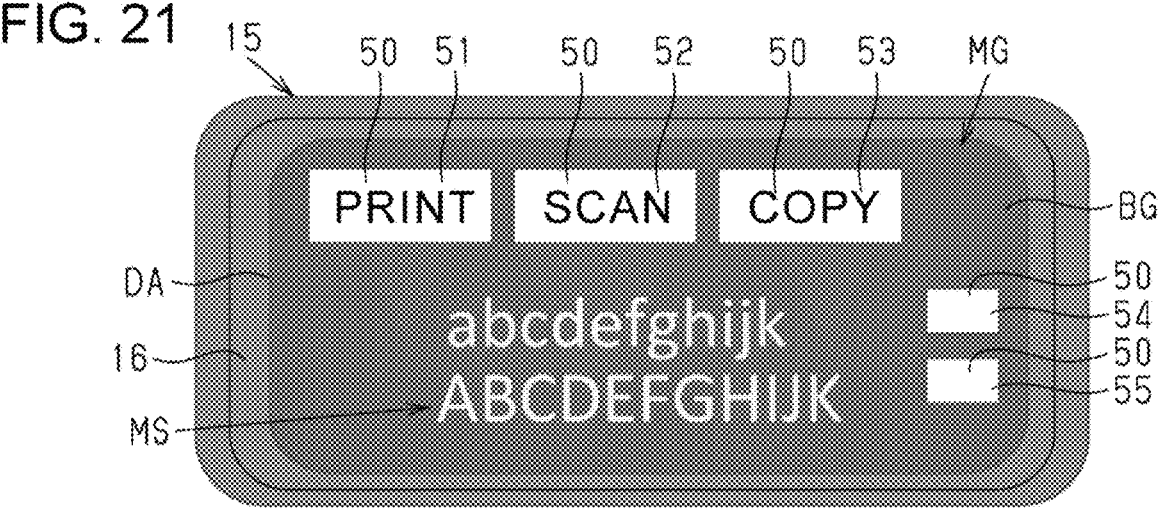
FIG. 21 is an illustrative diagram depicting a state in which the degree of visibility of the main screen displayed on the screen of the display section is low in a fifth embodiment.
Figure 22:
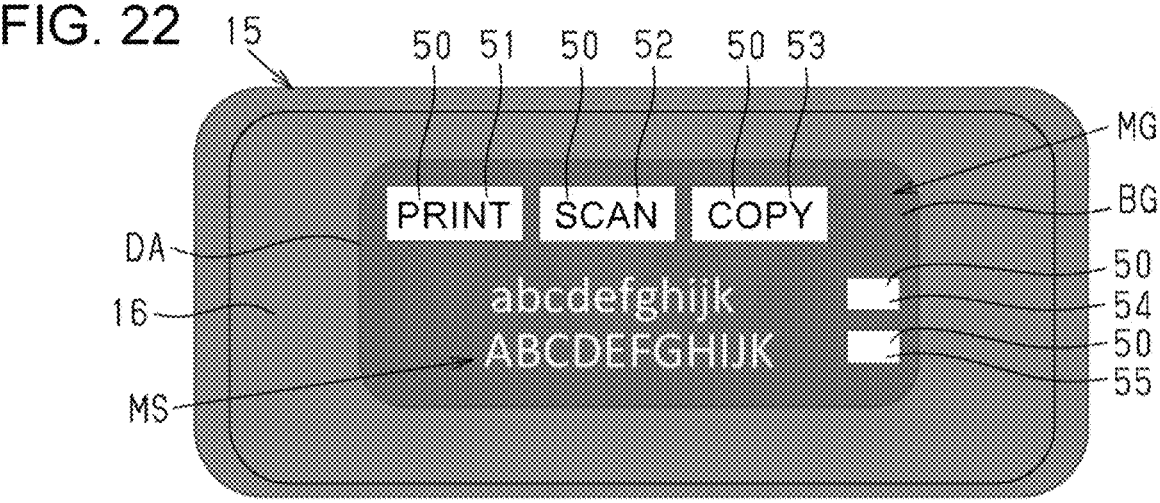
FIG. 22 is an illustrative diagram depicting a state in which the degree of visibility of the main screen is significantly low.

Specifically, as illustrated in FIG. 21, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the display size of the display region DA decreases stepwise or continuously. For example, each time the accumulated value of the parameter exceeds the first threshold SV1, as illustrated in FIGS. 21 and 22, the display size of the display region DA decreases stepwise. For the user, with a smaller display size of the display region DA, the input sections 50 have smaller display sizes and therefore the degrees of visibility of the input sections 50 are reduced. The reduction in the degree of visibility of display content of the screen 16 in such a manner encourages the user to carry out cleanup of the screen 16.

When the degree of visibility of display content of the screen 16 is reduced due to reduction of the display size of the display region DA, the user cleans the screen 16 at some timing. When cleaning up the screen 16, the user changes the mode from the cleanup management mode to the cleanup perform mode. The user wipes off the screen 16 to carry out cleanup, thereby returning the degree of visibility of display content of the screen 16 to the initial state illustrated in FIG. 3.

Figure 23:
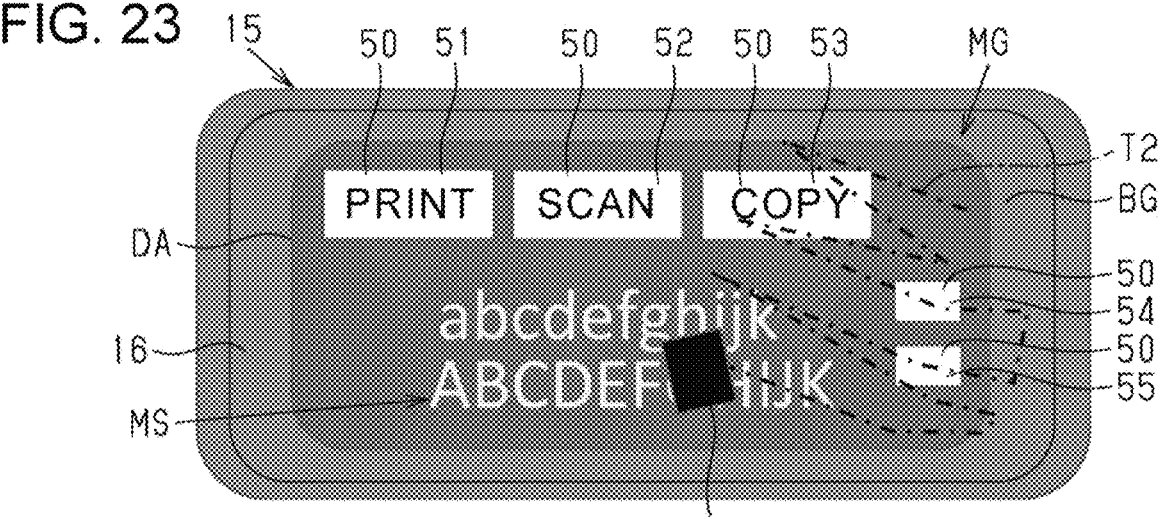
FIG. 23 is an illustrative diagram depicting a display control process when the main screen is wiped off.

In the example illustrated in FIG. 23, when the user wipes off the screen 16 for cleanup, the wiping section 74 displayed on the screen 16 moves along the wiping path T2, represented by a dash-dot line in FIG. 23, in which the user has performed wiping. With an increase in the wiped area (for example, the number of pixels) in which the user has wiped off the screen 16, the controller 20 greatly changes the display size of the display region DA in a stepwise or continuous manner.

The controller 20 according to the present embodiment increases the display size of the display region DA stepwise each time the wiped area (for example, the number of pixels) in which the user has wiped off the screen 16 exceeds the second threshold SV2. With the entire screen 16 being wiped clean by the user, the display size of the display region DA of the screen 16 returns to the same initial state as in FIG. 3. That is, the display size of the input section 50 on the screen 16 returns to the same size as in the initial state. In this way, when the user has finished wiping off the entire screen 16, the screen 16 returns to the initial state illustrated in FIG. 3.

The controller 20 returns the cleanup perform mode to the cleanup management mode by receiving a completion operation of the user who has cleaned up the screen 16 or by a time limit counted from the return of the display content of the screen 16 to the initial state.

According to the fifth embodiment, the advantageous effects of 1-1, 1-2, 1-4, 1-5, and 1-7 to 1-13 in the first embodiment are obtained similarly, and additionally the following advantageous effects are obtained.

5-1. The reduction in the degree of visibility is caused by decreasing the sizes of the input sections 50. According to this configuration, the degree of visibility is reduced by decreases in the sizes of the input sections 50 on the screen 16. This makes it likely to encourage the user to voluntarily carry out cleanup of the screen 16.

Sixth Embodiment

Next, with reference to FIGS. 24 to 26, a sixth embodiment will be described. The basic configuration and electrical configuration of the multi-function printer 11 are similar to those in the first embodiment described above, and a description will be given below focusing on differences from the first embodiment.

The controller 20 accumulates the value of at least one parameter since the previous screen cleanup and, in accordance with the accumulated value of the parameter, reduces the degree of visibility of display content displayed on the screen.

In order to reduce the degree of visibility of the display content, the controller 20 decreases the size of the display region DA, which is a region for displaying display content (display screen) on the screen 16. In the sixth embodiment, the degree of visibility of the display content is reduced by reducing the display region DA of the screen 16 in which a display screen is drawn while maintaining the display sizes of display screens, such as the main screen MG, displayed on the screen 16. In the example illustrated in FIG. 24, the display region DA is changed to be small, resulting in the region displayed in the main screen MG being changed to be small. That is, the controller 20 reduces the degree of visibility of the main screen MG by reducing the display size of the display region DA of the main screen MG to a small size. This reduces the degree of visibility of display content of the screen 16.

Figure 24:
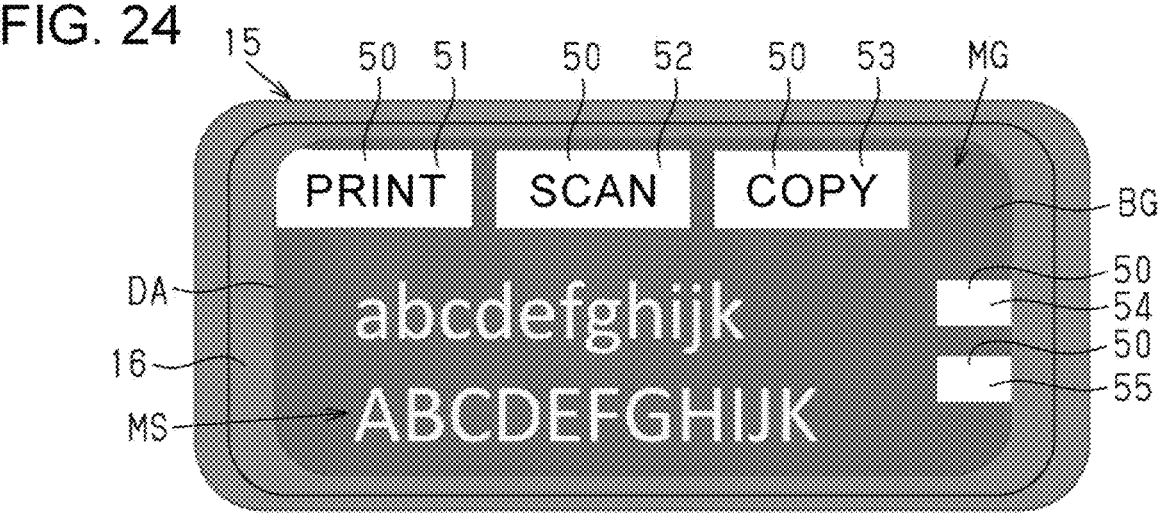
FIG. 24 is an illustrative diagram depicting a state in which the degree of visibility of the main screen displayed on the screen of the display section is low in a sixth embodiment.
Figure 25:
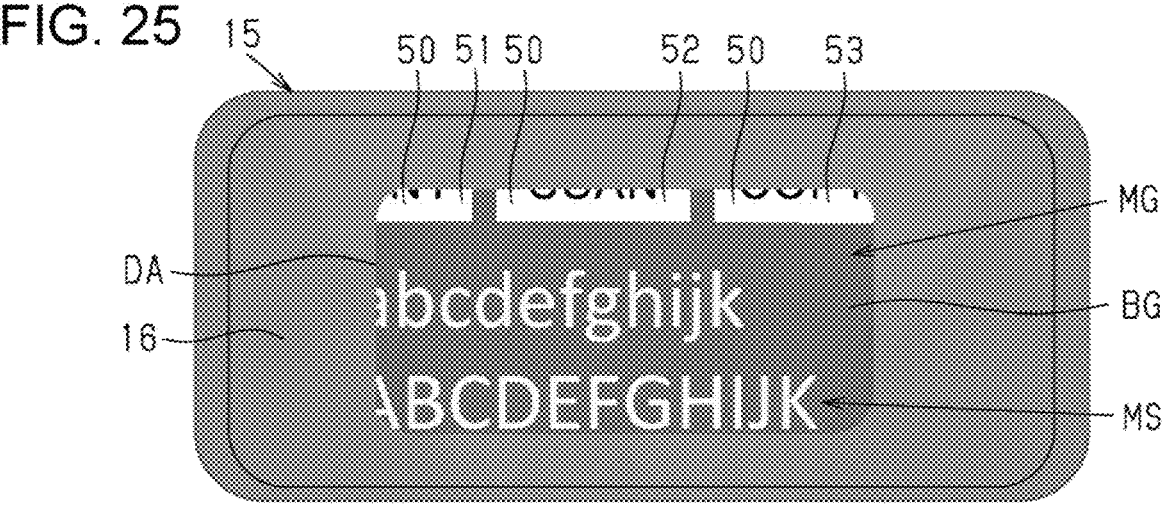
FIG. 25 is an illustrative diagram depicting a state in which the degree of visibility of the main screen is significantly low.

Specifically, as illustrated in FIG. 24, on the screen 16, with an increase in the accumulated value of a parameter, which is at least one of an elapsed time since the previous screen cleanup, the number of operations of the user since the previous screen cleanup, an operation time period, or the number of persons who approached the multi-function printer 11 since the previous screen cleanup, the display size of the display region DA decreases stepwise or continuously. For example, each time the accumulated value of the parameter exceeds the first threshold SV1, as illustrated in FIGS. 24 and 25, the display size of the display region DA decreases stepwise. For the user, with a smaller display size of the display region DA, the display region DA of the main screen MG has a smaller display size and therefore the degree of visibility of the main screen MG is reduced. The reduction in the degree of visibility of display content of the screen 16 in such a manner encourages the user to carry out cleanup of the screen 16.

When the degree of visibility of display content of the screen 16 is reduced due to reduction of the display size of the display region DA, the user cleans the screen 16 at some timing. When cleaning up the screen 16, the user changes the mode from the cleanup management mode to the cleanup perform mode. The user wipes off the screen 16 to carry out cleanup, thereby returning the degree of visibility of display content of the screen 16 to the initial state illustrated in FIG. 3.

Figure 26:
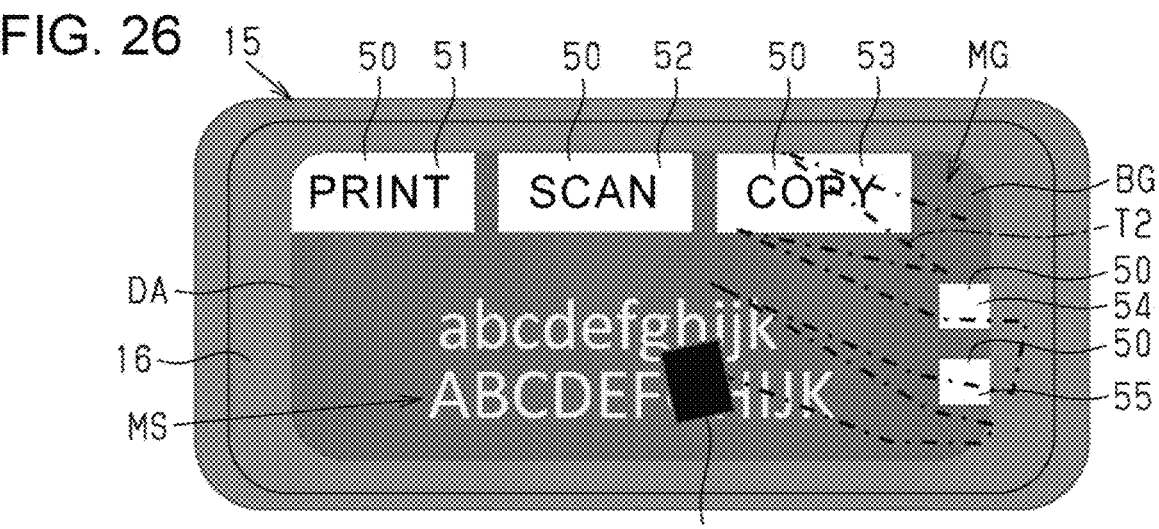
FIG. 26 is an illustrative diagram depicting a display control process when the main screen is wiped off.

In the example illustrated in FIG. 26, when the user wipes off the screen 16 for cleanup, the wiping section 74 displayed on the screen 16 moves along the wiping path T2, represented by a dash-dot line in FIG. 26, in which the user has performed wiping. With an increase in the wiped area (for example, the number of pixels) in which the user has wiped off the screen 16, the controller 20 greatly changes the display size of the display region DA in a stepwise or continuous manner.

The controller 20 according to the present embodiment increases the display size of the display region DA stepwise each time the wiped area (for example, the number of pixels) of the screen 16 in which the user has performed wiping exceeds the second threshold SV2. With the entire screen 16 being wiped clean by the user, the display size of the display region DA of the screen 16 returns to the same initial state as in FIG. 3. That is, the display size of the input section 50 on the screen 16 returns to the same size as in the initial state. In this way, when the user has finished wiping off the entire screen 16, the screen 16 returns to the initial state illustrated in FIG. 3.

The controller 20 returns the cleanup perform mode to the cleanup management mode by receiving a completion operation of the user who has cleaned up the screen 16 or by a time limit counted from the return of the display content of the screen 16 to the initial state.

According to the sixth embodiment, the advantageous effects of 1-1, 1-2, 1-4, 1-5, and 1-7 to 1-13 in the first embodiment are obtained similarly, and additionally the following advantageous effects are obtained.

6-1. The reduction in the degree of visibility is caused by decreasing the size of the display region DA, which is a region for displaying display content on the screen 16. According to this configuration, the degree of visibility is reduced due to a decrease in the size of display region DA on the screen 16. This makes it likely to encourage the user to voluntarily carry out cleanup of the screen 16.

The embodiments described above may be modified into the forms such as modifications described below. Furthermore, an appropriate combination of the embodiment described above and a modification described below may be a further modification, and an appropriate combination of modifications described below may also be a further modification.

In the first embodiment, to reduce the degree of visibility of display content of the screen 16, the obstacles 61, 63, and 73 in the second and fourth embodiments may further be displayed.

In the second embodiment, as in the fourth embodiment, the controller 20 may stepwise or continuously change the display densities of the obstacles 61, 63 such that the display densities decrease with an elapsed time since the display of the obstacles 61, 63.

In the second embodiment, instead of the image in which the obstacles 61, 63 are swept out when the user carries out cleanup of the screen 16, an image in which the obstacles 61, 63 are wiped off as in the fourth embodiment may be displayed.

In the first and third embodiments, the reduction in the degree of visibility of display content may be performed by increasing the display density. In the first embodiment, the degree of visibility of a display screen may be reduced by increasing the display density of the main screen MG, which is the display screen. In addition, in the third embodiment, a high density region may be employed instead of the low density region 71.

In the fifth and sixth embodiments, reducing the degree of visibility of display content may include decreasing the display density of display content.

In each of the embodiments, the display apparatus may have a configuration including the cleanup management mode but not including the cleanup perform mode.

The multi-function printer 11, which is an exemplary display apparatus, may have a configuration including one reader of either of a flatbed method and a feeding method.

The display apparatus is not limited to the multi-function printer 11 and may be a printer that includes neither a scanning mechanism nor a copying mechanism. In this case, the printer may be an ink jet printer or a dot impact printer. In addition, the display apparatus may be a printing machine. In addition, the multi-function printer 11 and the printer may each be any one of a serial printer, line printer, or page printer.

The display apparatus may be a scanner including a display section.

The display apparatus may be an electronic device other than the multi-function printer 11, a printer, or a scanner. That is, the display apparatus may be an electronic device including a display section. The electronic device may be a home appliance including a display section. In the case where the number of persons who approached a display apparatus is a parameter, an electronic device shared by a plurality of persons is desirable.

Technical ideas understood from the embodiments and modifications described above will be described below together with the advantageous effects.

A. A display apparatus includes a display section with a screen, including an input section for input of a location on the screen as a contact location by a touch on the screen, and a controller configured to change display content of the screen and configured to control the display section. When at least one of factors indicating a degree of contamination of the screen since previous screen cleanup is a parameter, the controller is configured to accumulate a value of the at least one parameter since the previous screen cleanup and is configured to, in accordance with the accumulated value of the parameter, reduce a degree of visibility of display content displayed on the screen.

According to this configuration, since the degree of visibility of the display content is reduced based on an accumulated value of at least one parameter accumulated since the previous screen cleanup, the reduction in the degree of visibility may encourage the user to voluntarily carry out cleanup of the screen. Therefore, the frequency at which the screen is left without being cleaned up may be reduced.

B. In the display apparatus described above, the at least one parameter may include at least one of an elapsed time since the previous screen cleanup, the number of operations in touch with the screen performed since the previous screen cleanup, an operation time period, or the number of persons who approached the display apparatus since the previous screen cleanup.

According to this configuration, since at least one of the elapsed time, the number of operations, the operation time period, or the number of persons who approached the display apparatus since the previous screen cleanup is used as a parameter, the user may be timely encouraged to voluntarily carry out cleanup of the screen.

C. In the display apparatus, the controller may reduce the degree of visibility of the display content at locations in accordance with operation locations of the user in the screen.

According to this configuration, the degree of visibility is more reduced at a location of the screen at which the user performs an operation more frequently. This makes it more likely to encourage the user to voluntarily carry out cleanup of the screen.

D. In the display apparatus described above, the reduction in the degree of visibility may include a change in display density. According to this configuration, the degree of visibility is reduced by a change in the display density on the screen. This makes it likely to encourage the user to voluntarily carry out cleanup of the screen.

E. In the display apparatus described above, the reduction in the degree of visibility may include display of an obstacle. According to this configuration, the degree of visibility is reduced by displaying the obstacle on the screen. This makes it likely to encourage the user to voluntarily carry out cleanup of the screen.

F. In the display apparatus described above, the reduction in the degree of visibility may include a decrease in size of the input section.

According to this configuration, the degree of visibility is reduced by a decrease in the size of the input section on the screen. This makes it likely to encourage the user to voluntarily carry out cleanup of the screen.

G. In the display apparatus described above, the reduction in the degree of visibility may include a decrease in size of a display region that is a region for display of the display content on the screen.

According to this configuration, the degree of visibility is reduced by a decrease in the size of an operation section on the screen. This makes it likely to encourage the user to voluntarily carry out cleanup of the screen.

H. In the display apparatus described above, the controller may return the degree of visibility to its initial state when cleanup of the screen is carried out.

According to this configuration, the degree of visibility returns to the initial state when cleanup of the screen is carried out. This makes it likely to encourage cleaning.

I. In the display apparatus described above, the controller may increase the degree of visibility stepwise or continuously as cleanup of the screen proceeds.

According to this configuration, as the cleanup of the screen proceeds, the degree of visibility increases. This facilitates recognition of the degree of advancement of the cleanup.

J. In the display apparatus described above, the controller may increase the degree of visibility of a region of the screen in which cleanup is finished.

According to this configuration, the degree of advancement of cleanup of the screen may be recognized by the user. For example, unfinished cleanup is less likely to occur.

K. In the display apparatus described above, the controller may have a cleanup management mode for encouraging cleaning of the screen. When the cleanup management mode is in the on state, the controller may perform a process of reducing the degree of visibility of display content in accordance with the accumulated value of the parameter. The controller may be configured to switch between the on and off states of the cleanup management mode. According to this configuration, the selection may be made when it is desired to encourage cleanup of the screen.

L. In the display apparatus described above, the controller may reduce the degree of visibility of the display content when the accumulated value of the parameter exceeds the threshold.

According to this configuration, the degree of visibility of the display content may be reduced stepwise in accordance with the accumulated value of the parameter. For example, the burden of processing of the controller may be reduced.

M. The display apparatus described above may include a threshold change operation section that is operated by a user to enable the threshold to be changed.

According to this configuration, since the user may change the threshold by operating the threshold change operation section, the speed of reducing the degree of visibility may be adjusted. Therefore, the user may be encouraged at a more appropriate timing to carry out cleanup of the screen.

N. In the display apparatus described above, the controller may obtain a total accumulated value of a plurality of parameters by using a conversion formula for the plurality of parameters and may determine whether the accumulated value exceeds a threshold.

According to this configuration, since the total accumulated value of the plurality of parameters is appropriately obtained using the converted values, the degree of contamination of the screen may be appropriately evaluated from a plurality of factors. Therefore, the user may be encouraged at a more appropriate timing to carry out cleanup of the screen.

O. The display apparatus described above may include a detector that detects at least one of the temperature, humidity, dust amount, or oil content amount of an ambient environment or the body temperature of an operator. The accumulated value of the parameter may be corrected by multiplying the accumulated value by a coefficient in accordance with a detected value obtained by the detector, or the threshold is changed based on a detected value obtained by the detector.

According to this configuration, the degree of contamination of the screen is evaluated based on an accumulated value in consideration of at least one of the temperature, humidity, dust amount, or oil content amount of the ambient environment or the body temperature of the operator. Therefore, the user may be encouraged at a more appropriate timing to carry out cleanup of the screen.

P. Provided is a display control method for a display apparatus including a display section with a screen. The display apparatus includes the display section including an input section for input of a location on the screen as a contact location by a touch on the screen, and a controller configured to control an operation of the display section. The controller has, as an operation mode of the display section, a cleanup management mode for encouraging cleaning of the screen. The display control method includes, at least in the cleanup management mode, using, as a parameter, at least one of an elapsed time, the number of operations, an operation time period, or the number of persons who approached a multi-function printer, since previous cleanup, accumulating a value of the parameter and, in accordance with the accumulated value of the parameter, reducing a degree of visibility of display content of the display section, and increasing the degree of visibility of the display content of the display section in accordance with a contact area detected as a result of cleanup of the screen. According to this method, as with the display apparatus, the frequency at which the screen is left without being cleaned up may be reduced.

Q. Provided is a non-transitory computer-readable storage medium storing a display control program executed by a computer included in a display apparatus including a display section with a screen. The display apparatus includes the display section including an input section for input of a location on the screen as a contact location by a touch on the screen, and the computer configured to control an operation of the display section. The computer has, as an operation mode of the display section, a cleanup management mode for encouraging cleaning of the screen. The display control program, when executed by the computer, causing the computer to execute, at least in the cleanup management mode, using, as a parameter, at least one of an elapsed time, the number of operations, an operation time period, or the number of persons who approached a multi-function printer, since previous cleanup, accumulating a value of the parameter and, in accordance with the accumulated value of the parameter, reducing a degree of visibility of display content of the display section, and increasing the degree of visibility of the display content of the display section in accordance with a contact area detected as a result of cleanup of the screen. According to the non-transitory computer-readable storage medium storing a display control program, as with the display apparatus, the frequency at which the screen is left without being cleaned up may be reduced.

What is claimed is:

1. A display apparatus comprising:
   a display section with a screen, including an input section on the screen for input of an instruction to the display apparatus; and
   a controller configured to change display content of the screen and configured to control the display section, wherein
   the controller is configured to switch between an on and off states of a cleanup perform mode according to the input to the input section, and the cleanup perform mode disables the input to the input section and enables cleaning of the screen,
   at least one of factors indicating a degree of contamination of the screen since previous screen cleanup is a parameter,
   the controller is configured to control the display section to display obstacles obstructing display content displayed on the screen, the obstacles encouraging the input for switching to the on state of the cleanup perform mode by accumulating a value of the parameter since the previous screen cleanup and is configured to, in accordance with the accumulated value of the parameter, increase a display density of each obstacle thereby reducing a degree of visibility of the display content displayed on the screen,
   the controller is configured to reduce the degree of visibility of the display content when the accumulated value of the parameter exceeds a threshold, and
   the controller is configured to obtain a total accumulated value of a plurality of the parameters by using a conversion formula for the plurality of parameters and is configured to determine whether the total accumulated value exceeds the threshold.

2. The display apparatus according to claim 1, wherein the parameter includes at least one of an elapsed time since the previous screen cleanup, a number of operations in touch with the screen performed since the previous screen cleanup, an operation time period, or a number of persons who approached the display apparatus since the previous screen cleanup.

3. The display apparatus according to claim 1, wherein the controller is configured to reduce the degree of visibility of the display content at a location in accordance with the contact location of a user in the screen.

4. The display apparatus according to claim 1, wherein the reduction in the degree of visibility includes a change in display density.

5. The display apparatus according to claim 1, wherein the reduction in the degree of visibility includes display of each obstacle.

6. The display apparatus according to claim 1, wherein the reduction in the degree of visibility includes a decrease in size of the input section.

7. The display apparatus according to claim 1, wherein the reduction in the degree of visibility includes a decrease in size of a display region, the display region being a region for display of the display content on the screen.

8. The display apparatus according to claim 1, wherein the controller is configured to return the degree of visibility to an initial state when cleanup of the screen is carried out.

9. The display apparatus according to claim 8, wherein the controller is configured to increase the degree of visibility stepwise or continuously as cleanup of the screen proceeds.

10. The display apparatus according to claim 1, wherein the controller is configured to increase the degree of visibility of a region of the screen in which cleanup is finished.

11. The display apparatus according to claim 1, wherein the controller has a cleanup management mode for encouraging cleaning of the screen and is configured to, when the cleanup management mode is in an on state, display the obstacles thereby reducing the degree of visibility of the display content in accordance with the accumulated value of the parameter, and the controller is configured to switch between on and off states of the cleanup management mode.

12. The display apparatus according to claim 1, further comprising:

a threshold change operation section configured to be operated by a user so as to change the threshold.

13. The display apparatus according to claim 1, further comprising:

a detector configured to detect at least one of a temperature, a humidity, a dust amount, or an oil content amount of an ambient environment, or a body temperature of an operator, wherein the accumulated value of the parameter is corrected by multiplying the accumulated value by a coefficient in accordance with a detected amount obtained by the detector or the threshold is changed based on a detected value obtained by the detector.

14. The display apparatus according to claim 1, wherein the controller controls the display density of each obstacle based on passage of time following a display time of each obstacle.

15. A display control method for a display apparatus including a display section with a screen, the display apparatus including the display section including an input section on the screen for input an instruction to the display apparatus, and a controller configured to control the display section to display obstacles obstructing display content displayed on the screen, the controller having, as operation modes of the display section, a cleanup perform mode disables the input to the input section and enables cleaning of the screen and a cleanup management mode for encouraging the cleanup perform mode, the display control method comprising:

at least in the cleanup management mode, using, as a parameter, at least one of an elapsed time, a number of operations, an operation time period, or a number of persons who approached a multi-function printer, since previous cleanup, accumulating a value of the parameter and, in accordance with the accumulated value of the parameter, increasing a display density of each obstacle thereby reducing a degree of visibility of the display content of the display section; and increasing the degree of visibility of the display content of the display section in accordance with a contact area detected as a result of cleanup of the screen, wherein the controller is configured to reduce the degree of visibility of the display content when the accumulated value of the parameter exceeds a threshold, and the controller is configured to obtain a total accumulated value of a plurality of the parameters by using a conversion formula for the plurality of the parameters and is configured to determine whether the total accumulated value exceeds the threshold.

16. A non-transitory computer-readable storage medium storing a display control program executed by a computer included in a display apparatus including a display section with a screen, the display apparatus including the display section including an input section on the screen for input an instruction to the display apparatus, and the computer configured to control the display section to display obstacles obstructing display content displayed on the screen, the computer having, as operation modes of the display section, a cleanup perform mode disabling the input to the input section and enabling cleaning of the screen and a cleanup management mode for encouraging the cleanup perform mode, the display control program, when executed by the computer, causing the computer to execute:

at least in the cleanup management mode, using, as a parameter, at least one of an elapsed time, a number of operations, an operation time period, or a number of persons who approached a multi-function printer, since previous cleanup, accumulating a value of the parameter and, in accordance with the accumulated value of the parameter, increasing a display density of each obstacle thereby reducing a degree of visibility of display content of the display section; and increasing the degree of visibility of the display content of the display section in accordance with a contact area detected as a result of cleanup of the screen, wherein the computer is configured to reduce the degree of visibility of the display content when the accumulated value of the parameter exceeds a threshold, and the computer is configured to obtain a total accumulated value of a plurality of the parameters by using a conversion formula for the plurality of the parameters and is configured to determine whether the total accumulated value exceeds the threshold.

* * * * *